US006334756B1

(12) United States Patent
Akiyama et al.

(10) Patent No.: US 6,334,756 B1
(45) Date of Patent: Jan. 1, 2002

(54) TURBINE ROTOR, COOLING METHOD OF TURBINE BLADES OF THE ROTOR AND GAS TURBINE WITH THE ROTOR

(75) Inventors: Ryo Akiyama, Hitachi; Shinya Marushima, Hitachinaka; Manabu Matsumoto, Ibaraki-machi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/506,811

(22) Filed: Feb. 18, 2000

(30) Foreign Application Priority Data

Feb. 23, 1999 (JP) .................................................. 11-044118

(51) Int. Cl.⁷ ...................................................... F01D 5/18
(52) U.S. Cl. ...................... 415/116; 415/114; 416/96 R; 416/96 A; 416/198 A; 416/201 R
(58) Field of Search ..................................... 415/114, 115, 415/116; 416/95, 96 R, 96 A, 198 A, 201 R

(56) References Cited

U.S. PATENT DOCUMENTS 4,484,858 A * 11/1984 Kurosawa et al. ............. 416/95
4,645,424 A * 2/1987 Peters ....................... 416/198 A
5,593,274 A   1/1997 Carreno et al.
5,695,319 A * 12/1997 Matsumoto et al. ........... 416/95
5,755,556 A * 5/1998 Hultgren et al. ........... 416/96 R
6,053,701 A * 4/2000 Ichiryu et al. .............. 416/96 R

* cited by examiner

Primary Examiner—Christopher Verdier
(74) Attorney, Agent, or Firm—Mattingly, Stanger & Malur, P.C.

(57) ABSTRACT

A turbine rotor for a gas turbine includes first and second wheels each having turbine blades fixed to a peripheral portion thereof, and a spacer arranged so as to be sandwiched between the first and second wheels. A partitioning member is provided between the spacer and at least one of the first and second wheels. Coolant paths in which coolant for cooling the turbine blades flows, are provided inside the turbine blades. A cavity formed by the partitioning member and the spacer is provided in a recovery course through which the coolant passed through the coolant paths is exhausted from the turbine blades.

20 Claims, 19 Drawing Sheets

TURBINE ROTOR, COOLING METHOD OF TURBINE BLADES OF THE ROTOR AND GAS TURBINE WITH THE ROTOR

BACKGROUND OF THE INVENTION

The present invention relates to a turbine rotor of a gas turbine and a cooling method of turbine blades of the turbine rotor. Particularly, the present invention relates to a turbine having a structure for recovering coolant cooled turbine blades.

A turbine rotor disclosed in WO 97/44569 (PCT/US97/04368) is formed by arranging a plurality of disc-shaped wheels, each of which has turbine blades fixed to an outer peripheral portion thereof, so as to be laminated to each other, and fastening the wheels by bolts which are passed through the wheels. In the turbine rotor, respective members are mounted on adjacent two of the wheels by fixing them with bolts, and a cavity is formed between the members, whereby a high temperature recovery coolant is not directly contacted with the wheels. The wheels become high in temperature during operation. When a temperature difference occurs between adjacent left and right wheels, a difference in thermal expansion occurs because of temperature elevation of the left and right wheels, and a difference in thermal elongation also occurs between the left and right wheels.

Further, a spacer forming a cavity is fixed to one of the wheels at one side thereof and to another wheel at the other side, so that when a difference in thermal elongation occurs between the left and right wheels, different displacements also occur in the two members forming the cavity, interlocking with the wheels fixed to the spacer. Here, when there is a large gap in a sealing portion of the cavity, it becomes difficult to seal the cavity, and there occurs a problem that recovery coolant leaks. When the recovery coolant leaks at the cavity, a quantity of coolant which can be recovered becomes short, and there occurs a problem that the cycle efficiency is lowered. Further, since two spacer plates between adjacent two wheels are in contact with both the supply coolant of low temperature and recovery coolant of high temperature, there is a subject to be solved that a large temperature distribution occurs in the spacer plates, thereby to cause thermal stress and deformation.

Further, a turbine rotor disclosed in JP A 9-13902, U.S. Pat. No. 5,593,274 has such a structure that a supply cavity and recovery cavity for coolant cooling turbine blades are formed by a spacer and spacer plate, whereby high temperature recovery coolant is not directly contacted with the wheels. Here, the spacer plate contacts directly with the high temperature recovery coolant at its cavity side, so that the spacer plate becomes high in temperature and it is considered that the heat of the spacer plate is conducted to the wheels by heat conduction, whereby the wheel becomes high in temperature. Further, the spacer plate is fixed to the wheels by shrinkage fit. After the wheels and spacer become high in temperature during operation, upon occurrence of a temperature difference between the wheel adjacent to one side of the spacer plate and the spacer adjacent to the opposite side of the spacer plate, a difference in thermal expansion due to temperature elevation occurs between the wheel and the spacer, and a difference in thermal elongation also occurs between the wheel and the spacer. Further, when a difference in thermal expansion due to the temperature elevation occurs between the wheel and the spacer, a difference in displacement also occurs between the spacer and spacer plate forming a cavity. When there is a large gap in the sealing portion of the cavity, it is difficult to seal the cavity and there occurs a problem that recovery coolant leaks. Further, since both of low temperature supply coolant and high temperature recovery coolant are in contact with the spacer and the spacer plate, there is a problem that large thermal stress and deformation occur. Further, since the spacer plate has a coolant supply hole, coolant recovery hole and bolt hole each perforated therein, there is a problem that they become a cause of stress concentration and the strength becomes further weak. Further, in the above-mentioned prior arts, a stacking surface increases by providing a spacer plate between the wheel and the spacer as compared with the condition under which there is no such a spacer plate. Therefore, left is a subject that bending primary critical speed of the rotor is lowered.

SUMMARY OF THE INVENTION

An object of the present invention is to reduce thermal stress occurring in wheels without increasing a stacking surface.

A turbine rotor according to the present invention comprises a plurality of turbine blades each having a coolant path formed inside and permitting coolant to flow therein, a plurality of wheels having the plurality of turbine blades arranged annularly in peripheral portions thereof and forming the turbine rotor, annular members each arranged between adjacent wheels of the plurality of wheels, and heat-resistant members provided on side surfaces of the wheels positioned at side surfaces of the annular members, and the turbine rotor is characterized in that the coolant heated through heat-exchange with the turbine blades and flowing down through the coolant paths faces the annular members.

Further, a cooling method according to the present invention is for turbine blades of a turbine rotor provided with a plurality of wheels having a plurality of turbine blades arranged annularly in peripheral portions thereof and forming the turbine rotor and annular members each arranged between adjacent wheels of the plurality of wheels, and characterized in that heat-resistant members are provided on side surfaces of the wheels positioned at side surfaces of the annular members, coolant is flowed in coolant paths formed inside the turbine blades, and the coolant heated through heat-exchange with the turbine blades and flowing down through the coolant paths is flowed so as to face the annular members.

Further, a gas turbine provided with a turbine rotor according to the present invention comprises a plurality of turbine blades each having a coolant path formed inside and permitting coolant to flow therein, a plurality of wheels having the plurality of turbine blades arranged annularly in peripheral portions thereof and forming the turbine rotor, annular members each arranged between adjacent wheels of the plurality of wheels, and heat-resistant members provided on side surfaces of the wheels positioned at side surfaces of the annular members, and is characterized in that the coolant heated through heat-exchange with the turbine blades and flowing down through the coolant paths faces the annular members.

DESCRIPTION OF EMBODIMENTS OF THE INVENTION

In aspects of the present invention, such a construction is taken that a low temperature supply coolant and a high temperature recovery coolant do not contact with a spacer or the like arranged so as to be sandwiched between two wheels at the same time, whereby a large temperature distribution in the spacer as mentioned above and a large thermal stress each are suppressed to occur.

Further, in order to provide such a construction that a cavity (space) does not directly contact with the wheels, a spacer plate is arranged between the wheel and the spacer to form a recovery cavity by the spacer and the spacer plate. Here, the spacer plate serves a role of partitioning member, and it is an annular member, the shape of which is annular.

Since the high temperature recover coolant does not contact with the wheel, temperature distribution in the wheel axis direction is hard to occur, and thermal deformation and thermal stress of the wheel are reduced. At this time, the spacer plate becomes high in temperature because of direct contact with the high temperature recovery coolant, however, such a structure is taken that the spacer plate and the wheel do not contact with each other in a wide range by providing a cavity between the spacer plate and the wheel, whereby it is formed so that heat of the spacer plate is hard to conduct to the wheel. Further, by devising a structure in which the spacer plate moves interlocking with the spacer by fixing the spacer plate to the spacer by shrinkage fit, a difference in displacement between the spacer and the spacer plate is reduced. By reducing the displacement difference, it is easy to provide a sealing structure and it is possible to reduce a quantity of coolant leakage from the recovery cavity. Further, by providing a structure in which a stacking surface does not increase even if the spacer plate is provided, in the structure, bending primary critical speed of rotor vibrations does not lower.

Further, in another aspect of the invention, the strength of the spacer plate is prevented from being lowered by taking such a structure that a coolant recovery hole or a coolant supply hole are not perforated in the spacer plate.

Still further, in another aspect of the invention, the strength of the spacer is prevented from being lowered by taking such a structure in which a coolant recovery hole is not perforated in the spacer.

Figure 24:
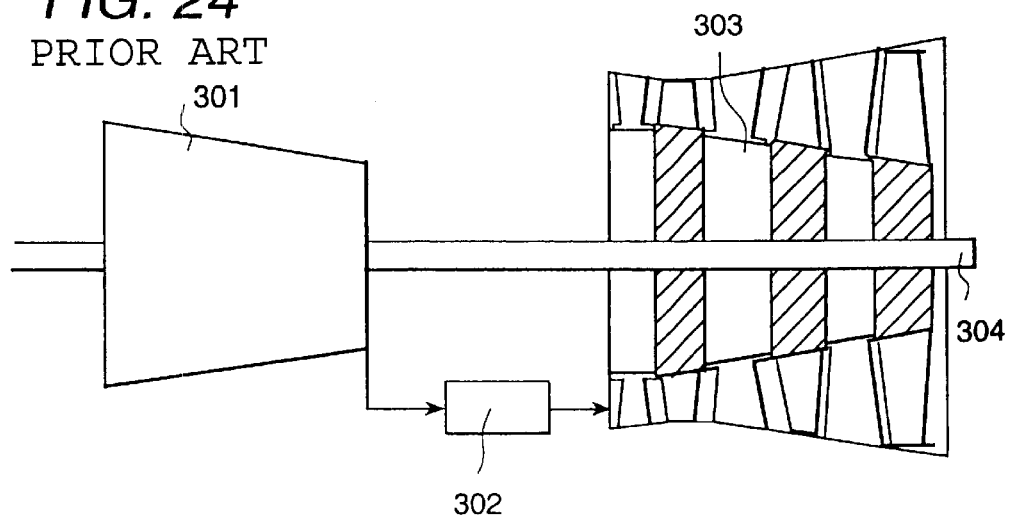
FIG. 24 is a sectional view of conventional turbine rotor.

Embodiments of the present invention will be described hereunder, referring to the drawings. FIG. 24 shows a view of a whole gas turbine and FIG. 25 shows an enlarged view of a turbine section of the gas turbine in FIG. 24.

As shown in FIG. 24, the gas turbine comprises a compressor 301, a combustor 302 and a turbine 303. In the gas turbine, air is compressed by the compressor 301, and the compressed air is introduced into the combustor 302. The compressed air and fuel are mixed and burnt in the combustor 302, and energy generated therein is recovered by the turbine 303 and rotates the turbine 303. During operation the gas turbine, working fluid is always burnt in the combustor 302. The compressor 301 and the turbine 303 rotate around the axis of a shaft 304 at a high speed.

Figure 25:
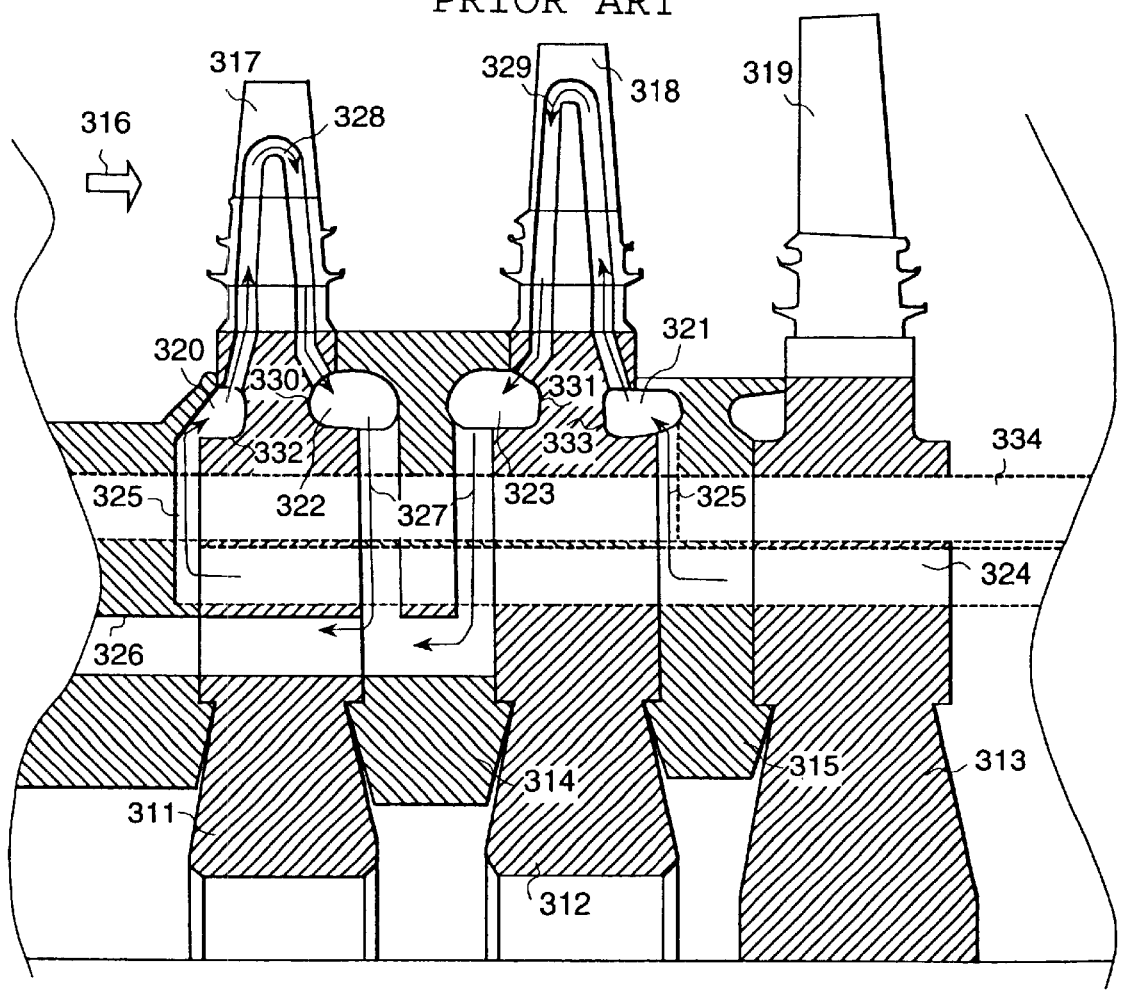
FIG. 25 is a sectional view of a conventional turbine rotor.

Further, as shown in FIG. 25, the turbine 303 comprises a plurality of wheels which form a turbine rotor and are composed of a first stage wheel 311, a second stage wheel 312, a third stage wheel 313, etc, each having turbine blades arranged annularly in an outer peripheral portion. As spacer members arranged between adjacent wheels of the plurality of wheels, spacers such as a first stage spacer 314, a second stage spacer 315, etc, are provided. Bolts 334 pass through the wheels and spacers. The wheels and spacers are fastened and fixed by the bolts 334 to form the turbine rotor. Here, the portions of the wheels and the spacers that contact with each other are referred to as stacking surfaces. The stacking surfaces are surfaces of the wheels and the spacers which are in contact with each other in the rotor axis direction.

Further, the turbine 303 comprises first stage turbine blades 317, second stage turbine blades 318 and third stage turbine blades 319 each taking out the energy which the working fluid burnt in the combustor 302 has. Here, the working fluid flows as indicated by an arrow 316 in FIG. 25. That is, the direction of flow of the high temperature working fluid is directed from the first stage side to the third stage side of the turbine blades.

Each of the turbine blades is provided with a mechanism including a cooling path for cooling the turbine blade. That is, the turbine blade is provided therein with a path allowing supply coolant for cooling the turbine blades to pass through. For example, for the first stage turbine blades 317, a supply hole 324 for supplying supply coolant, a supply mother pipe 325 for leading the supply coolant from the supply path 324 to a supply cavity 320, a cooling path inside each first stage turbine blade 317, a recovery cavity 322 collecting recovery coolant, a recovery mother pipe 327 for leading the recovery coolant from the recovery cavity 322 to a recovery hole 326, and the recovery hole 326 are provided. Further, for the second stage turbine blades 318, the supply hole 324 supplying the supply coolant, a supply mother pipe 325 for leading the supply coolant from the supply hole 324 to a supply cavity 321, the supply cavity 321 collecting the supply coolant, a cooling path inside each second stage turbine blade 318, a recovery cavity 323 collecting recovery coolant, the recovery mother pipe 327 for leading the recovery coolant from the recovery cavity 323 to the recovery hole 326, and the recovery hole 326.

The first stage turbine blades 317 and the second stage turbine blades 318 are close to the combustor 302, so that they are exposed to particularly high temperature. Therefore, the first stage turbine blades 317 and the second stage turbine blade 318 are particularly cooled with coolant. An arrow 328 indicates a flow direction that the coolant for cooling the first stage turbine blades 317 flows, and an arrow 329 indicates a flow direction of the coolant flowing in the second stage turbine blades 318.

Here, the number of wheels and spacers forming the rotor and the number of cavities according to the number of the wheels or the spacers, etc, should be understood to be sufficient even if they are different from in this explanation.

Further, as the coolant used here, compressed air taken out from the compressor 301, and steam taken out from a turbine in the case of a combined cycle are considered to be used. The coolant is low in temperature before it cools the turbine blades, and high in temperature after having cooled the turbine blades.

In such a gas turbine, the second stage spacer 315 has therein only the supply cavity 321 for coolant of low temperature, and the first stage spacer 314 has therein only the recovery cavities 322 and 323 for coolant of high temperature. That is, the rotor is formed so that the low temperature supply coolant and high temperature recovery coolant do not contact each other at the same time.

In the present embodiment, a cooling direction inside the first stage turbine blades 317 with respect to the rotor axis direction is opposite to a cooling direction inside the second stage turbine blades 318. Therefore, one side of the first stage spacer 314 contacts with the high temperature coolant passed through the interiors of the first stage turbine blades 317, and the other side of the first stage spacer 314 contacts with the high temperature coolant passed through the inside of the second stage turbine blades 318, whereby a large temperature difference does not occur between both sides of the first spacer 314.

Therefore, a temperature distribution (temperature gradient) is hard to occur in one spacer, and occurrence of thermal stress due to the temperature distribution (temperature difference) and thermal deformation are suppressed. However, since the high temperature recovery coolant inside the recovery cavity 322 and recovery cavity 323 directly contact with a wheel side surface 330 and wheel side surface 331, there is left a problem that the metal temperature of the wheel rises, an allowable stress of the wheel decreases and the strength become small.

Further, since wheel side surfaces 332 and 333 are in contact with low temperature supply coolant inside the supply cavities 320 and 321, there is left a problem that a temperature distribution in the rotor axis direction occurs in the wheel, and thermal stress and thermal deformation due to the temperature difference occur.

Figure 26:
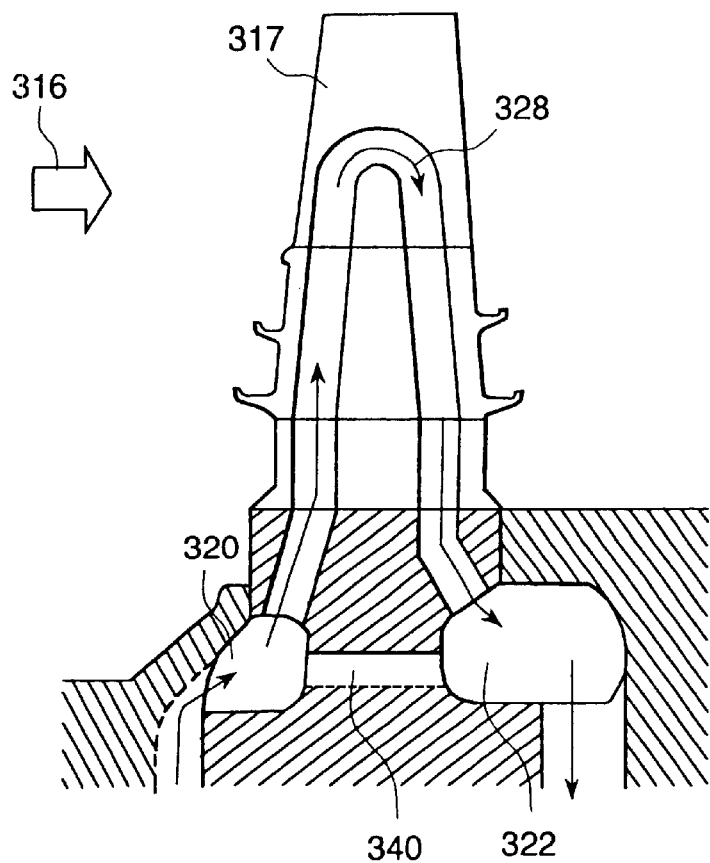
FIG. 26 is a sectional view of an embodiment of a structure for preventing temperature distribution in an axial direction of a wheel from occurring.

Next, a mechanism for suppression or prevention of occurrence of temperature distribution in the wheels in the rotor axis direction will be described, referring to FIG. 26. FIG. 26 is an enlarged sectional view of the rotor in the vicinity of the first stage turbine blade 317.

In the present embodiment shown in FIG. 26, a through hole 340 passing through the inside of the first stage wheel 311 is provided so as to communicate the supply cavity 320 and the recovery cavity 322. Since the supply cavity 320 collecting low temperature coolant and the recovery cavity 322 collecting high temperature coolant are communicated each other by the through hole 340, the low temperature coolant in the supply cavity 320 and the high temperature coolant in the recovery cavity 322 are mixed, whereby a temperature difference between both the coolants decreases. That is, the temperature difference between the side of the supply cavity 320 and the side of the recovery cavity 322 of the first stage wheel decreases. Therefore, occurrence of thermal stress due to the temperature difference in the first stage wheel 311 is suppressed, and thermal deformation of the wheel can be suppressed or prevented. Therefore, the reliability of the wheel can be raised.

However, in the present embodiment, since the low temperature coolant inside the supply cavity 320 leaks into the side of the recovery cavity 322, it is considered that coolant for cooling the turbine blades becomes short. In order to compensate the deficiency of the coolant, it is necessary to increase in advance the quantity of coolant for cooling the turbine blades. However, when the quantity of coolant is increased, a loss corresponding to the increase in coolant quantity increases, so that the problem that the efficiency is reduced occurs.

Figure 1:
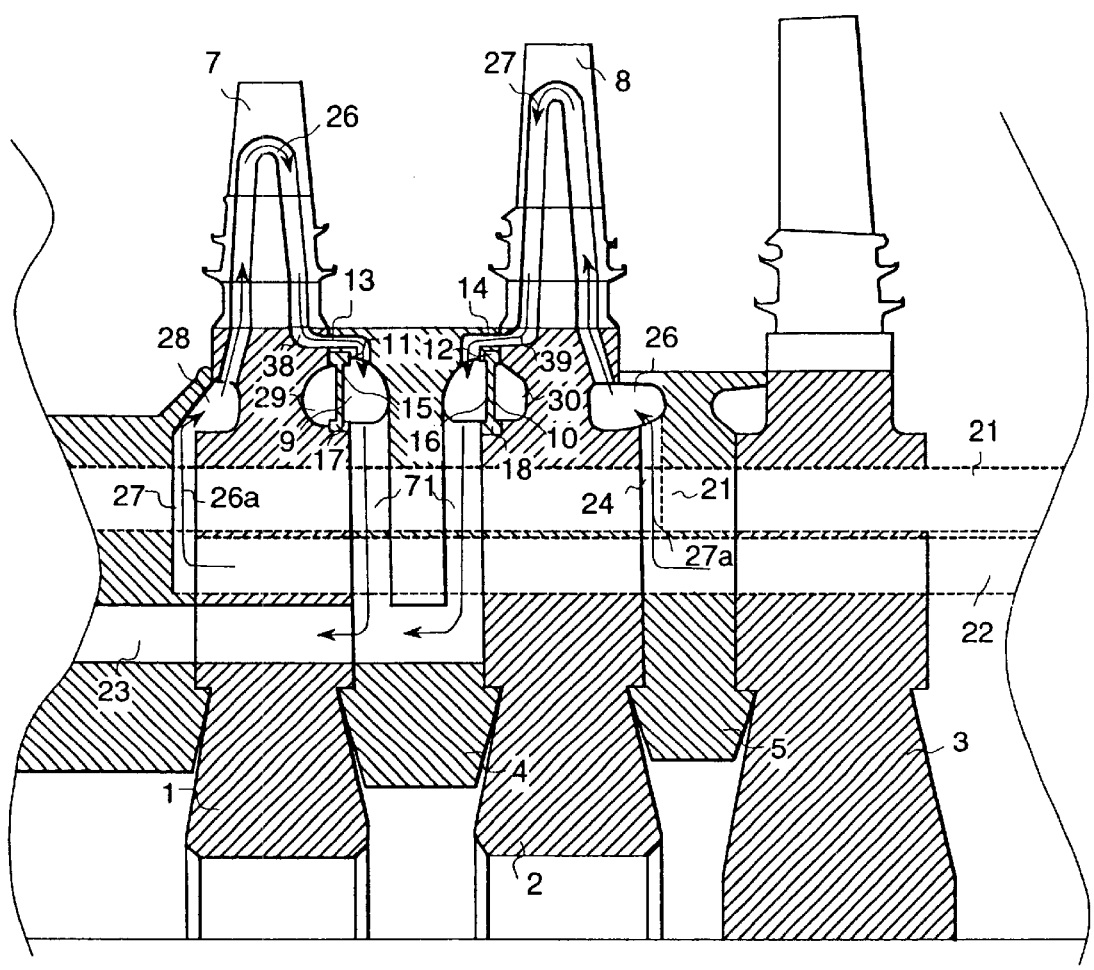
FIG. 1 is a sectional view of a turbine rotor of an embodiment of the present invention.

FIG. 1 is a sectional view of a turbine of an embodiment of the present invention. The turbine comprises a first stage wheel 1, a second stage wheel 2, a third stage wheel 3, etc, and a first stage annular spacer 4, a second stage spacer 5, etc.

In the present embodiment, as partitioning members, a spacer plate 15 and a spacer plate 16 are provided on wheel sides facing the side faces of the spacer members, respectively. The spacer plates 15 and 16 each are an annular member of heat resistance, and arranged so as to be sandwiched between the wheel and the spacer. By providing the heat resistant partitioning members in cooling passages for the coolant exhausted from the turbine blades, the heated coolant does not directly contact with the wheel, so that thermal stress occurring in the wheel can be reduced. Further, the partitioning members are arranged so as not to increase stacking surfaces. For example, provided are such spacer plates that the diameter (ring-shaped spacer plate) of an inner peripheral portion of the spacer plate is larger than the outer diameter of the stacking surface. By arranging the spacer plates so as not to increase the stacking surfaces, it is possible to maintain the strength as structural members.

Figure 29:
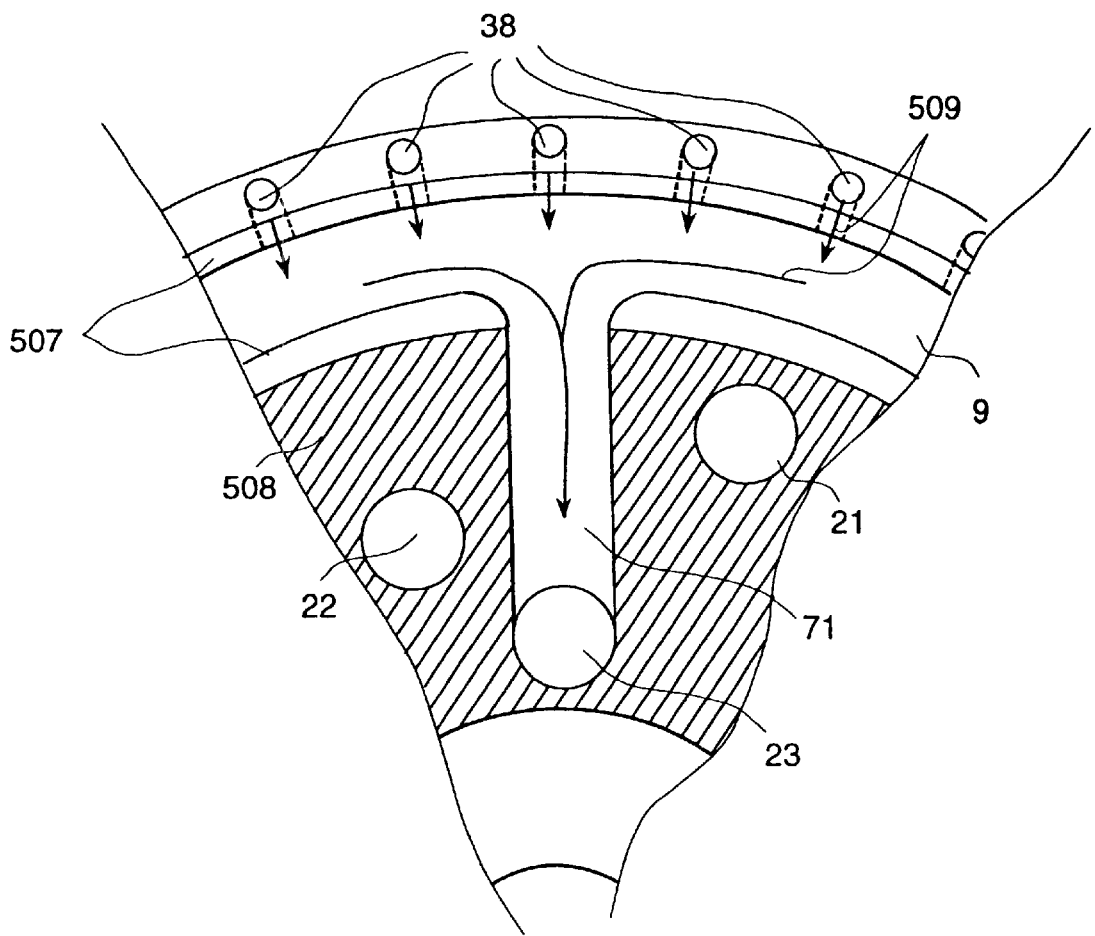
FIG. 29 is a front view of the spacer 4 in part shown in FIG. 1, viewed from a first stage turbine blade side.

FIG. 29 is a sectional view of a part of the spacer 4 which is an annular member of the turbine rotor, viewed from the first stage turbine blade side. The coolant is delivered into the first stage turbine blade 7 from a supply hole 22. The coolant cooling and flowing inside the first stage turbine blade 7 is heat-exchanged with the first stage turbine blade to be heated and passes through a coolant recovery path 38. The heated coolant flowed from the coolant recovery path 38 is introduced into a recovery cavity 9 which is an annular space. Then, the coolant is led from the recovery cavity 9 to a recovery hole 23 through a recovery mother pipe 71. Finally, the coolant is exhausted out of the turbine rotor. The coolant having a lot of heat exists in the vicinity of the recovery cavity 9 which is an annular space in which the heated coolant concentrates, and heat affection influencing surrounding members is large, and thermal deformation or the like of the surrounding members can be remarkably suppressed by suppressing the heat affection of those portions. Further, by providing an annular spacer between the spacer 15 and the first stage wheel 1, heat affection on the wheel can be further reduced.

Here, 507 denotes surfaces to which the spacer 15 and the wheel 1 are adjacent, and 508 denotes a stacking surface to which the first spacer 4 and the wheel 1 are adjacent. Spacer plate outer peripheral portion 11 and spacer plate outer peripheral portion 12 which are outer peripheral portions of the spacer plate 15 and the spacer plate 16 are in contact with inner sides of spacer projecting portions 13 and 14. The coolant cooled in the first stage turbine blades 7 bends in a L-shape toward the first spacer 4 inside the first stage wheel at the lower portion of the blades, passes through the coolant recovery path 38 inside the spacer, and then is led to the recovery cavity 9.

Further, the coolant cooled in the second stage turbine blades 8 bends in a L-shape toward the first stage spacer 4 inside the second stage wheel 2 at a lower portion of the blades, passes through a coolant recovery path 39 inside the spacer and is led to the recovery cavity 10.

Figure 2:
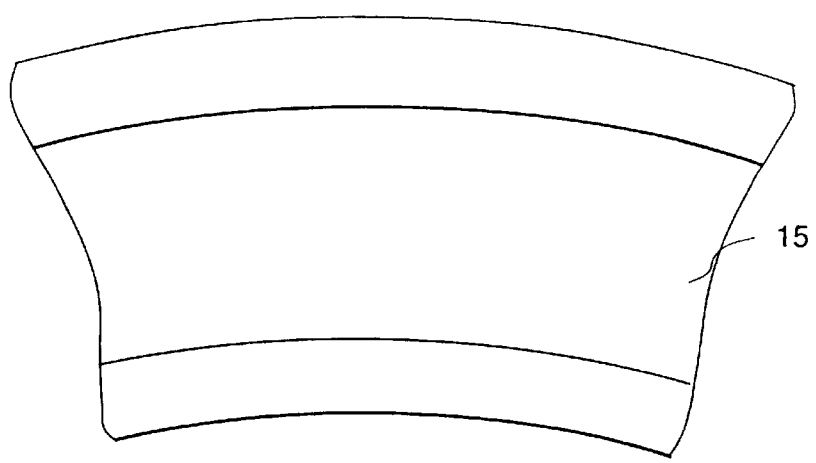
FIG. 2 is a front view of a spacer in part shown in FIG. 1, viewed from an axial direction.

FIG. 2 is a front view of a part of the spacer plate 15, 16 viewed from the axial direction. The spacer plate 15, 16 does not have therein any coolant recovery path for recovering the coolant which cooled the turbine blades. Therefore, stress concentration occurring if a hole such as a coolant recovery passage is perforated in the spacer plate does not occur, so that stress generated in the spacer plate is reduced and the reliability of the spacer plate is raised.

Further, since the spacer plate contacts directly with the high temperature recovery coolant, it is desirable to use heat resistant material. For example, JIS (SUH), Ni base alloy (non-aging hardening type, C: 0.05 wt %, Is: 0.1 wt %, Mn: 0.1 wt %, Cr: 19 wt %, Mo: 3 wt %, Co: 0.5 wt %, Fe: 18.5 wt %, balance: Ni), etc can be raised. By using heat resistant steel for the spacer plate which is a partitioning member, the life of the spacer plate extends and the reliability thereof rises.

Next, a method of mounting the spacer plates 15 and 16 will be explained. It is necessary to mount so that the spacer plate outer peripheral portions 11 and 12 of the spacer plates 15 and 16 are in contact with inner peripheral portions of the spacer projection portions 13 and 14 of the spacer. As procedures thereof, first, the spacer 4 is heated to increase, by expansion, the inner diameters of the spacer projection portions 13 and 14 which the spacer plate outer peripheral portions 11 and 12 contact with, and then the spacer plates 15 and 16 are assembled into the spacer 4 in the axial direction.

This method is called shrinkage fit. In this method, when the temperature of the spacer 4 lowered, the thermal expansion disappears, so that the inner diameters of the spacer projecting portions 13 and 14 contacting the spacer plate outer peripheral portions 11 and 12 decrease and the spacer plate outer peripheral portions 11 and 12 are brought into intimate adherence with each other.

Further, in another method, the spacer plate 15 and spacer plate 16 are cooled to shrink the diameters of the spacer plate outer peripheral portion 11 and 12, and then they are assembled into the spacer 4 in the axial direction. That is, shrinkage fit is effected. When the temperature of the spacer plates 15 and 16 rises, the diameter of each of the spacer plate outer peripheral portions 11 and 12 increases, and the spacer plate outer peripheral portions 11 and 12 are brought into intimate adherence with the inner peripheral sided of the spacer projecting portions 13 and 14.

Further, the wheels and spacers are fastened and fixed to the turbine rotor by bolts. Here, the portions at which the wheels and spacers are in contact with each other by fastening by the bolts are referred to as stacking surfaces.

Further, the turbine comprises the first stage turbine blades 7 and the second stage turbine blades 8 each taking out the energy possessed by the working fluid. For the first stage turbine blades 7, supply hole 22 supplying supply coolant, a supply mother pipe 27 supplying supply coolant from the supply hole 22 to the supply cavity 28, the supply cavity collecting the supply coolant, cooling paths inside the first stage turbine blades 7, the recovery cavity 9 collecting recovery coolant, the recovery mother pipe 71 leading the recovery coolant from the recovery cavity 9 to the recovery hole 23, and the recovery holes 23 are provided.

Further, for the second turbine blades 8, the supply hole 22 supplying the supply coolant, a supply mother pipe 24 leading the supply coolant from the supply hole to the supply cavity 26, a supply cavity 26 collecting the supply coolant, cooling paths inside the second stage turbine blades 8, the recovery cavity 10 collecting the recovery coolant, the recovery mother pipe 71 leading the recovery coolant from the recovery cavity 10 to the recovery hole 23 and the recovery hole 23 are provided.

The recovery cavity 9 and recovery cavity 10 each are formed so that the recovery coolant inside each of them does not contact with the first stage wheel 1 or the second stage wheel 2. Therefore, the first stage wheel 1 or the second stage wheel 2 is hard to be affected by the temperature of the recovery coolant. It is suppressed for the wheel to be becomes locally high in temperature.

Further, in the present embodiment, a cavity or cavities other than the recovery cavity 9 and the recovery cavity 10 exist between the spacer plate 15 and the first stage wheel 1 or between the spacer plate 16 and the second stage wheel 2. For example, the spacer plate 15 and a side surface 29 of the first stage wheel 1 are not directly contacted each other, and an air layer is exist therebetween.

In the same manner, the spacer plate 16 and a side surface 30 of the second stage wheel 2 are not directly contacted each other, and an air layer exist therebetween. When the air layer exists between the spacer place 15, 16 and the wheel side surface 29, 30, heat becomes hard to conduct to the first stage wheel 1 and the second stage wheel 2 because air has a low heat conductivity. Therefore, the high temperature recovery coolant does not directly contact with the first stage wheel 1 and the second stage wheel 2, further, an air layer exists between the spacer plate and the wheel side surface, whereby heat is hard to transfer through heat conduction from the spacer plate 15, etc, to the first stage wheel 1, etc, so that it is further suppressed for the wheel to become locally high in temperature.

A temperature gradient is hard to occur in temperature distribution between the first stage wheel 1 and the second stage wheel 2, and occurrence of thermal stress and thermal deformation due to the temperature difference can be reduced.

Here, 26a denotes a flow direction of coolant for cooling the first stage turbine blades 7, and 27a denotes a flow direction of coolant for cooling the second stage turbine blades 8. Here, the recovery coolant recovered after having cooled the turbine blades has been high in temperature.

Further, since the turbine blades are mounted on the outer peripheral portion of each of the wheels, centrifugal force of them is acting on the wheel, and a large stress is acting on the wheel. If the recovery coolant of high temperature directly contact with the wheel, the metal temperature of the wheel rises, whereby the allowable stress of the wheel lowers and the strength of the wheel also lowers. In order to prevent the strength from being lowered, the recovery cavities 9, 10 according to the present invention are formed so that the high temperature recovery coolant does not directly contact with the wheel side portions 29, 30.

Further, when turbine blades of larger weight are mounted, large stress is always applied on the wheel. Here, the centrifugal force of the spacer plates 15, 16 are applied on the spacer projecting portions 13 and 14 of the spacer 4, so that the centrifugal force due to the spacer plates is not applied on the first stage wheel and the second stage wheel 2. Therefore, it is possible to prevent the reliability of the wheels from being lowered by the increase in centrifugal force acting on the wheels by provision of the spacer plates.

Figure 27:
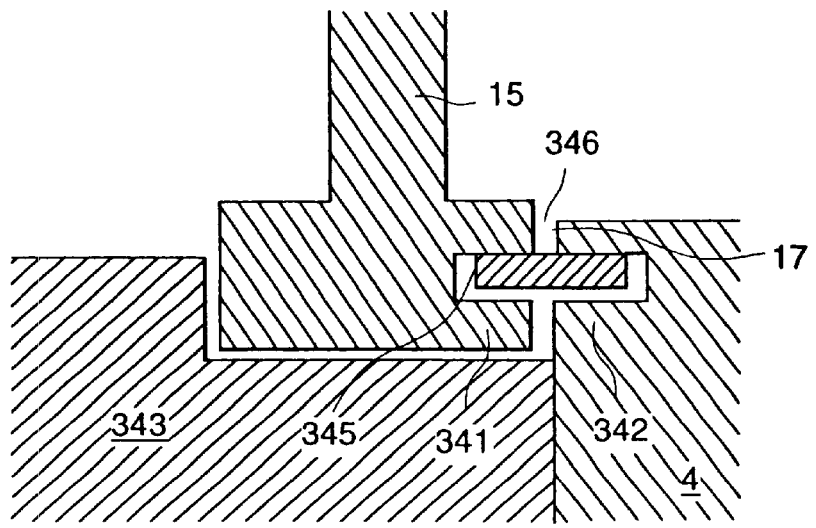
FIG. 27 is a sectional view of an example of a sealing structure.

Further, when the recovery coolant leaks from the recovery cavity, the quantity of coolant to be recovered decreases and the efficiency of the gas turbine lowers. Therefore, a sealing mechanism is provided at portions of gaps 17 and 18 so that the recovery coolant inside the recovery cavity does not leak therefrom. FIG. 27 is a view showing an example of the sealing mechanism.

In FIG. 27, 342 denotes a portion of the spacer 4 in the vicinity of the gap 17, 341 denotes a portion of the spacer plate 15 in the vicinity of the gap 17, and 343 is a wheel. The spacer portion 342 has a groove formed as shown in the figure, and the spacer plate portion 341 has a groove formed as shown in the figure. 345 denotes a seal plate inserted in the grooves. By inserting the seal plate 345 inside the grooves in this manner, it is considered to seal by checking the flow of the recovery coolant leaked from the recovery cavity in a direction of line 346. In such a sealing mechanism, a displacement difference between the spacer plate portion 341 and the spacer portion 342 occurs, when a large deviation between the groove of the spacer plate portion 341 and the groove of the spacer portion 342 occurs, sealing is difficult. The recovery cavities 9, 10 according to the present invention are formed by the spacer 4 and the spacer plates 15, 16 as mentioned above.

And, since the spacer plates 15, 16 are fixed to the spacer 4 by shrinkage fit, when the spacer is thermally expanded and deformed due to temperature elevation, the spacer plates 15, 16 move interlocking with displacement of the spacer 4. Therefore, a displacement difference between the spacer 4 and the spacer plates 15, 16 forming the recovery cavity is always small, so that it is easy to seal between the gaps 17, 18 and a leakage quantity of recovery coolant from the recovery cavities 9, 10 decreases, whereby a quantity of coolant that can be recovered increases and the efficiency of the gas turbine rises.

Further, variation in scale of the gap 17, 18 of each recovery cavity 9, 10 in the peripheral direction becomes small, so that local leakage of the recovery coolant decreases, whereby a temperature distribution in the peripheral direction is hard to occur in the spacer 4, the wheels 1, 2, a temperature distribution occurs in the stacking surfaces contacting with the spacer and the wheel 1, 2 in the peripheral direction, concave and convex of the stacking surface caused by change, in the peripheral direction, in a quantity of thermal expansion in the axial direction due to the temperature elevation become hard to be generated, the flatness of the stacking surface becomes high, and a degree of intimate adhesion is improved.

Therefore, decrease in frictional force of the stacking surfaces can be suppressed and slide of the stacking surfaces can be suppressed, which can prevent the bolts 334 fixing the wheels and the spacer from being applied by a large shearing stress.

Further, considering a critical speed of the rotor, when the stacking surface exists at a certain position, a bending primary critical speed of the rotor, caused by bending of the rotor is lowered as compared with when the stacking surface does not exist at that position. In many cases, the bending primary critical speed of the rotor is necessary to be higher than the revolution speed of the gas turbine during operation, so that usually, the rotor is designed so that the bending primary critical speed of the rotor becomes high no matter how little. In the turbine rotor according to the present invention, the stacking surface is not increased irrespective of arranging the spacer plate 15 between the first stage spacer 4 and the first stage wheel 1 and arranging the spacer plate 16 between the first stage spacer 4 and the second stage wheel 2. Therefore, the bending primary critical speed of the rotor also can be suppressed to be lowered.

Figure 3:
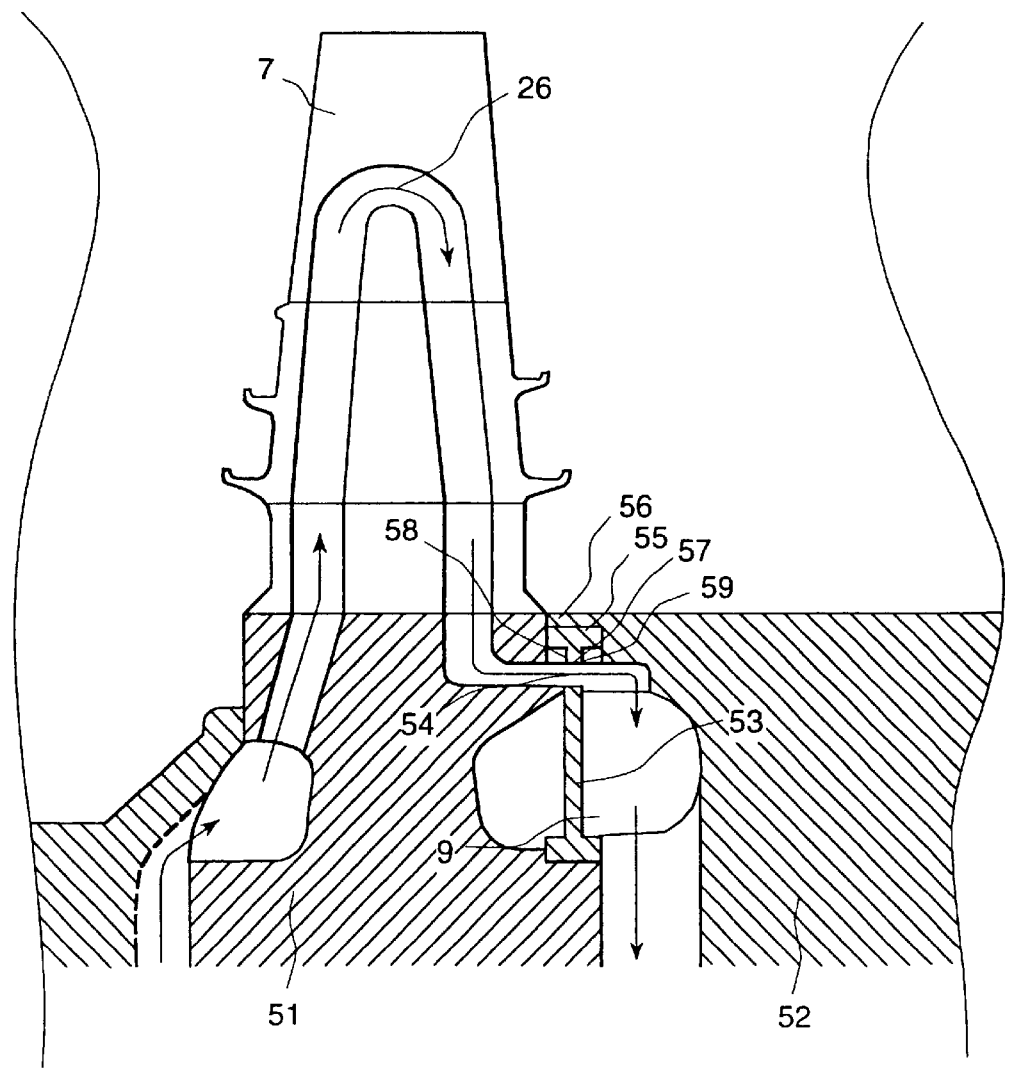
FIG. 3 is a sectional view of a modification of the turbine rotor of the present invention shown in FIG. 1.

FIG. 3 is a sectional view showing a modification of the wheels 1, 2, spacer 4 and spacer plates 15, 16 shown in FIG. 1.

Figure 4:
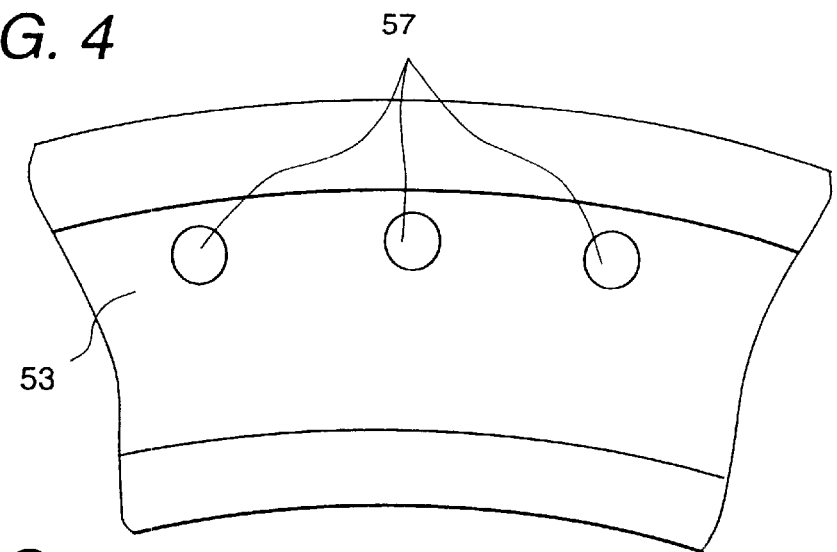
FIG. 4 is a front view of the spacer in part shown in FIG. 3, viewed from an axial direction.

51 denotes a first stage wheel, 52 denotes a first stage spacer adjacent to the first stage wheel 51, 53 denotes a spacer plate arranged so as to be sandwiched between the first stage wheel 51 and the first stage spacer 52, and 54 denotes a coolant recovery path. The spacer plate 53 is inserted in the spacer by shrinkage fit so that the outer peripheral portion of the spacer plate contacts with the inner peripheral portion of a spacer projecting portion 56. The coolant having cooled the first stage turbine blades 7 bends in a L-shape inside the first stage wheel under the blades 7, flows in the coolant recovery path inside the spacer plate, flows in the coolant recovery path inside the spacer, and then is led to the recovery cavity 9. FIG. 4 is a view of the spacer plate 53 viewed from the axis direction. The spacer plate 53 has coolant recovery passages 57 for recovering the coolant. In the present embodiment, in portions 58, 59 in the vicinity of the coolant recovery passages, the spacer plate is sandwiched between the wheel and the spacer, so that those portions are heat-shielded. Therefore, even if a temperature difference occurs between the portions 58 and 59 in the vicinity of the coolant recovery passages, it is possible to suppress occurrence of large thermal stress in the vicinity of the coolant recovery passages by the temperature difference.

Figure 5:
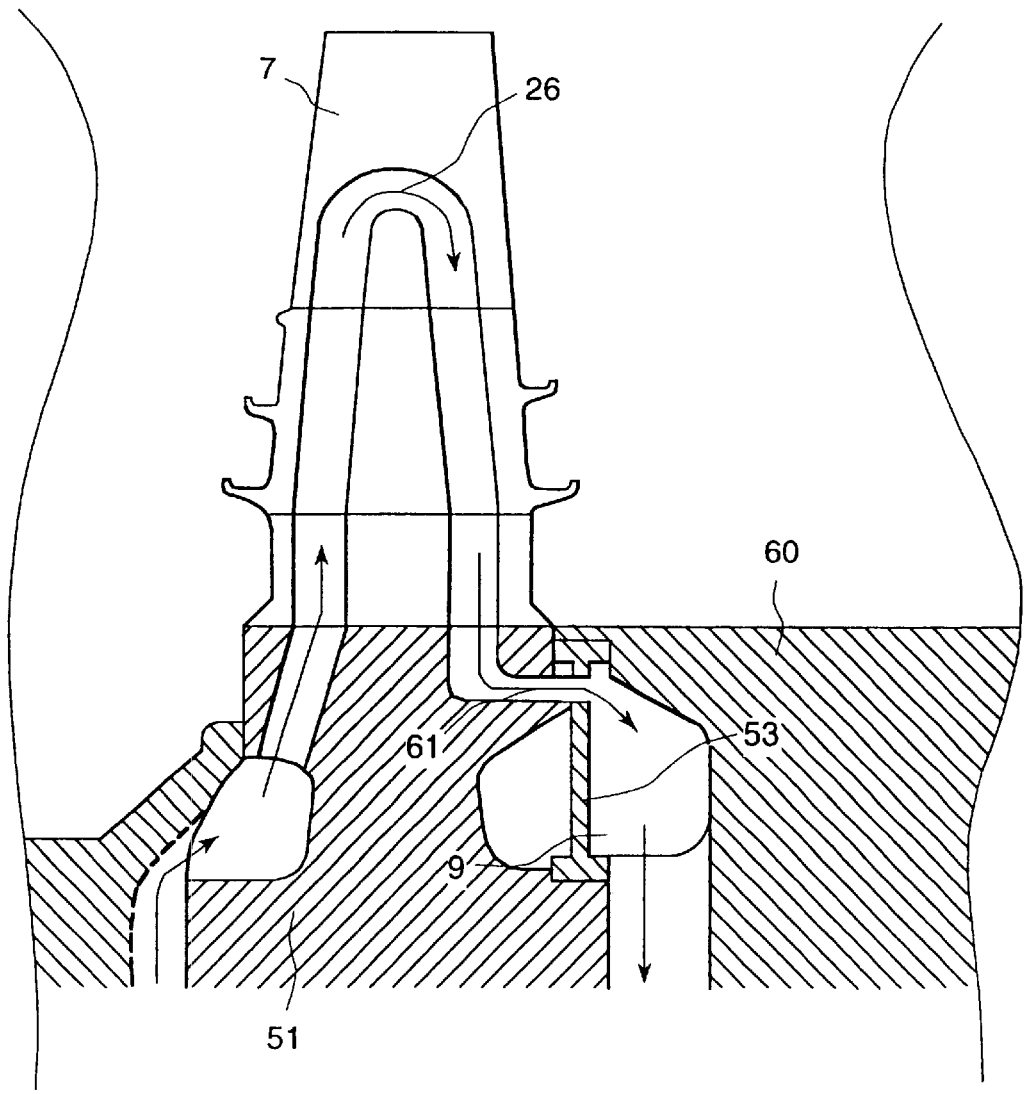
FIG. 5 is a sectional view of a modification of the turbine rotor of the present invention shown in FIG. 3.

Further, FIG. 5 shows a modification of the spacer 52 of the embodiment shown in FIG. 3.

60 denotes a spacer and 61 denotes a coolant recovery path. The coolant having cooled the first stage turbine blades 7 bends in a L-shape toward the spacer 60 inside the fist stage wheel 51 under the blades 7, flows in the coolant recovery path inside the spacer plate and then is led to the recovery cavity 9. In the present embodiment, the spacer does not have any coolant recovery passage for recovering the coolant. Therefore, since stress concentration which may be caused by the passage if formed therein does not occur on the spacer, stress occurring in the spacer is reduced, and the reliability of the spacer rises.

Figure 6:
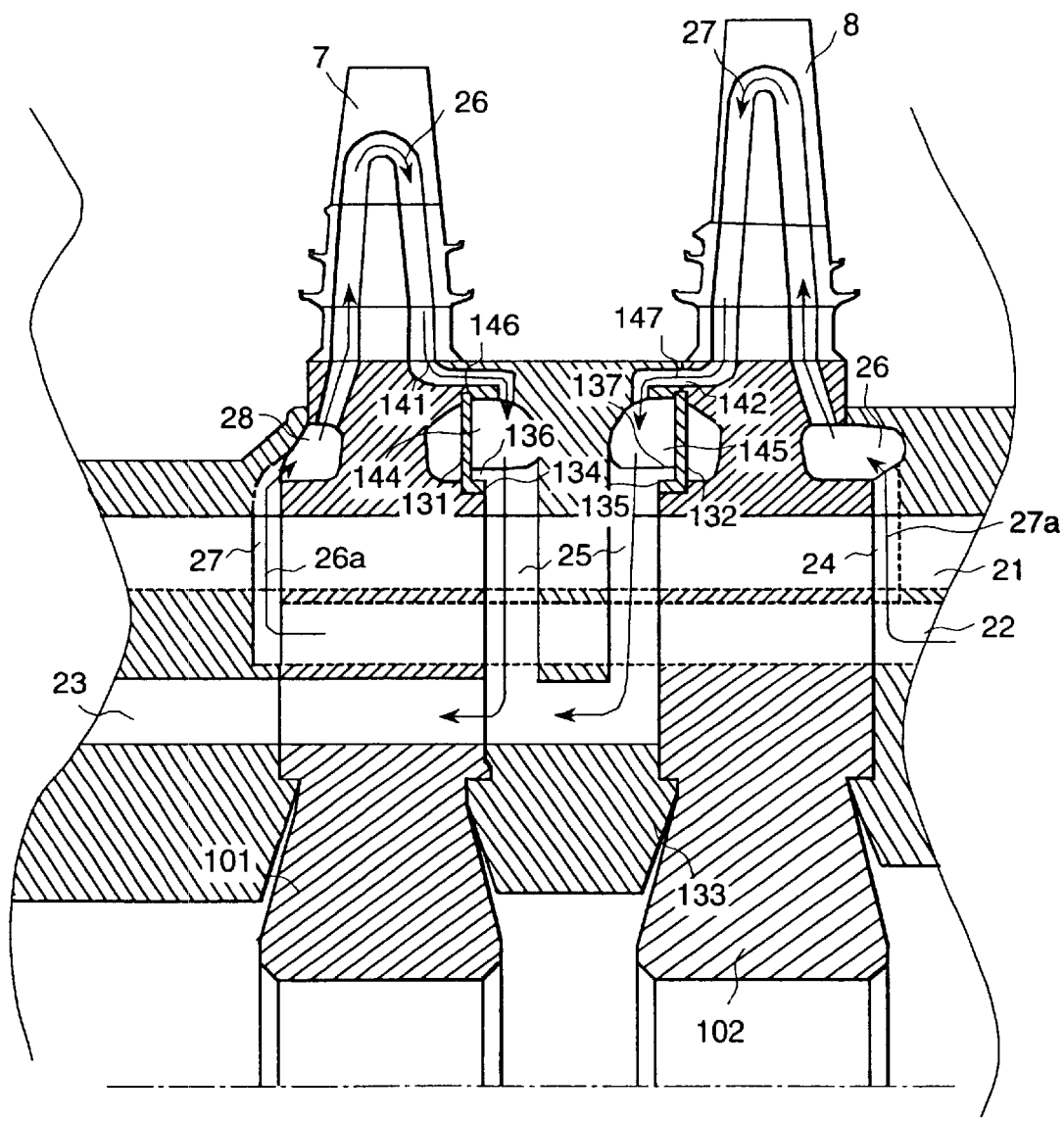
FIG. 6 is a sectional view of a turbine rotor of another embodiment of the present invention.

FIG. 6 is a sectional view of a turbine rotor of another embodiment of the present invention.

Figure 7:
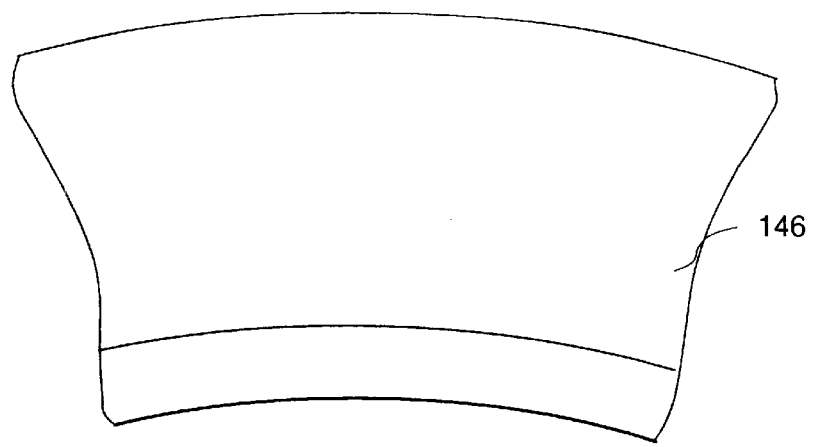
FIG. 7 is a front view of the spacer in part shown in FIG. 6, viewed from an axial direction.

101 denotes a first stage wheel, 102 denotes a second stage wheel, and 133 notes a first stage spacer. 131 and 132 each denote a spacer plate arranged so as to be sandwiched between the wheel and the spacer and having, at a lower end thereof, a projecting portion, the outer peripheral side 134, 135 of which is contact with an inner peripheral side of a projecting portion 136, 137 of a spacer shoulder portion. The coolant having cooled the first stage turbine blades 7 bends in a L-shape toward the first stage spacer 133 inside the first stage wheel 101 under the blades, flows in a coolant recovery path 141 inside the spacer and then is led to a recovery cavity 144. The coolant having cooled the second stage turbine blades 8 bends in a L-shape toward the first stage spacer 133 in the second stage wheel 102 under the blades, flows in a coolant recovery path 142 inside the spacer and then is led to a recovery cavity 145. FIG. 7 is a view of a part of the spacer plate 131, 132, viewed in an axial direction. The spacer plate 131, 132 does not have any coolant recovery passage for recovering the coolant having cooled the turbine blades. Therefore, there is no stress concentration on the spacer plate, which may be caused if the spacer plate has a hole such as a coolant recovery path, so that the stress generated on the spacer plate is reduced and the reliability of the spacer plate is improved.

Figure 28:
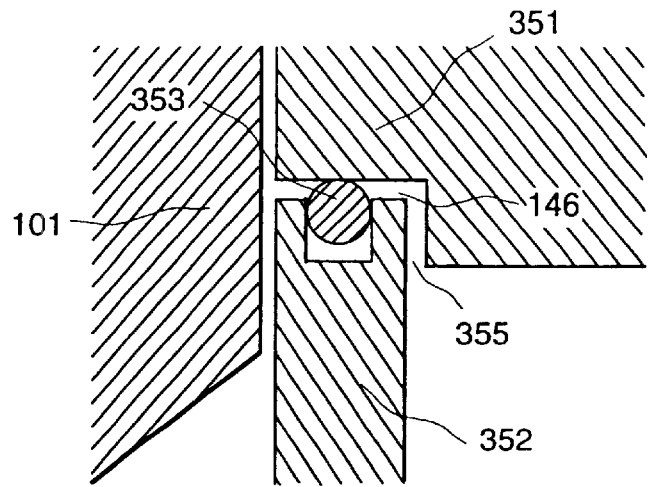
FIG. 28 is a sectional view of another example of a sealing structure.

As a method of mounting the spacer plate 131, 132 so that the outer peripheral side 134, 135 of projecting portion of the spacer plate 131, 132 is in contact with the inner peripheral side of projecting portion 136, 137 of the spacer shoulder portion, shrinkage fit is taken. 21 denotes holes for bolts 334 fixing the wheels and the spacer, 22 denotes a supply hole for supplying coolant, and 23 denotes a recovery hole for recovering the coolant. 144 denotes a recovery cavity formed by the first stage spacer 133 and the spacer plate 131 for collecting the coolant which has been high in temperature by cooling the first stage turbine blades 7, and 145 denotes a recovery cavity formed by the first stage spacer 133 and the spacer plate 132 for collecting the coolant which has been high in temperature by cooling the second stage turbine blades 8. It will be understood that the recovery cavities 144, 145 are formed so that high temperature recovery inside the cavities is not contacted with the first stage wheel 101 or the second stage wheel 102. Therefore, since the first and second stage wheels 101, 102 do not directly contact with the high temperature recovery coolant, temperature distribution is hard to occur in the first and second stage wheel 101, 102, and occurrence of thermal stress and thermal deformation due to the temperature distribution are reduced. Further, 24 and 27 denote supply mother pipes for leading the coolant from the supply hole 22 to the supply cavities 26, 28, respectively, and 25 denotes recovery mother pipes for leading the coolant from the recovery cavities 144, 145 to the recovery hole 23, respectively. 26a denotes a flow direction of coolant for cooling the first stage turbine blades 7, and 27a denotes a flow direction of coolant for cooling the second stage turbine blades 8. Here, the recovery coolant recovered after cooling the turbine blades is high in temperature. Further, a sealing mechanism for preventing the recovery coolant inside the recovery cavity from leaking is provided at a gap 146. FIG. 28 is a sectional view showing an example of a sealing structure of the gap 146. 351 denotes a portion in the vicinity of the gap 146 of the spacer 133 and 352 denotes a portion in the vicinity of the gap 146 of the spacer 131. A groove is provided in the portion 352. 353 denotes a sealing wire inserted in the groove. It is considered to seal by inserting the sealing wire 353 in this manner and checking thereby a flow of recovery coolant which leaks otherwise from the recovery cavity in a direction indicated by an arrow 355. In such a sealing structure, when a displacement difference between the spacer plate 352 and the spacer 351 occurs and a large gap between the groove of the spacer plate 352 and the spacer 354 is produced, sealing becomes difficult. In the present embodiment, since the spacer plates 131, 132 is fitted in and fixed to the first stage spacer 133 by shrinkage fit, the first stage spacer 133 and the spacer plates 131, 132 forming the recovery cavities 144, 145 are interlocked and move together. Therefore, the gaps 146, 147 are always small and it is easy to seal the gaps 146, 147. Further, centrifugal force of the spacer plate 131, 132 acts on the inner peripheral side of the projecting portion 136, 137 of the spacer shoulder portion. Therefore, the centrifugal force of the spacer plate 131, 132 does not act on the wheel, so that stress generated in the wheel can be suppressed. Further, the stacking surface is not increased irrespective of provision of the spacer plate 131, 132, so that bending primary critical speed can be suppressed to be lowered.

Figure 8:
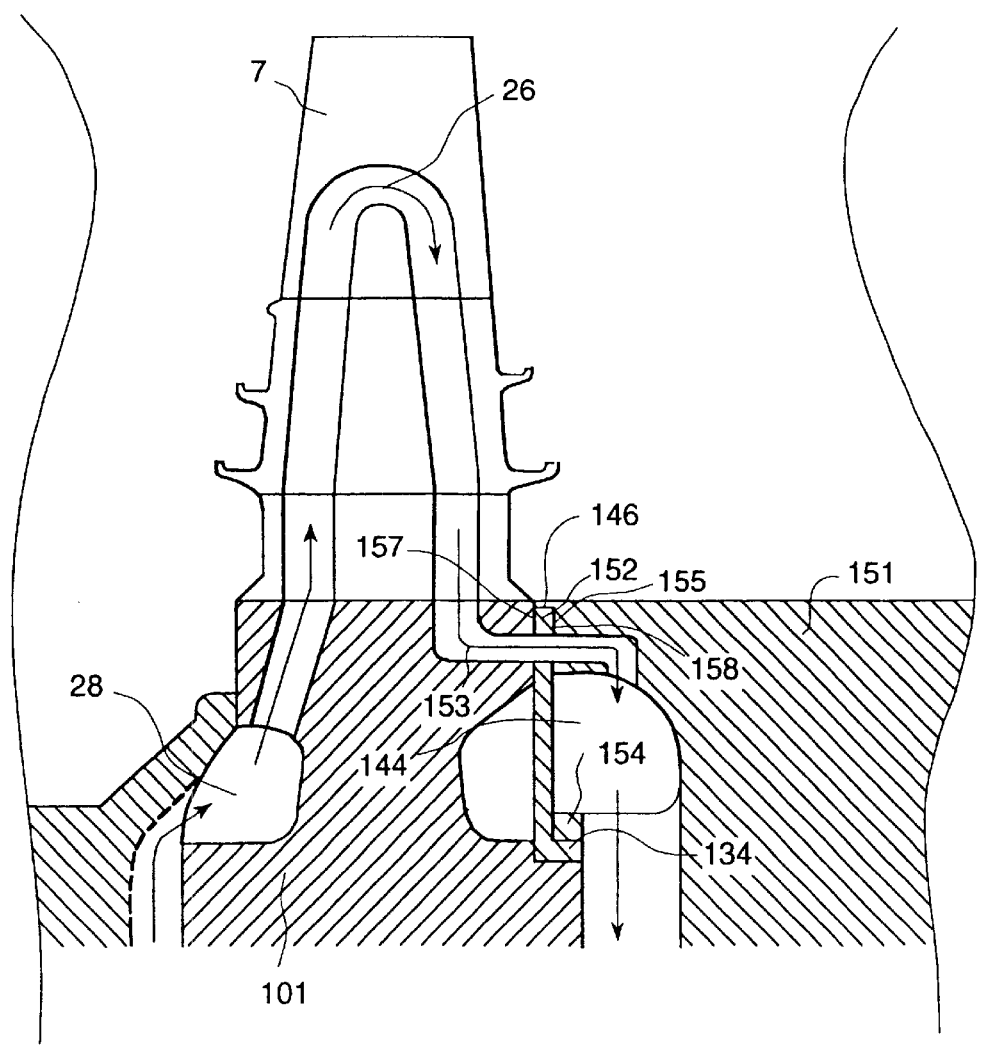
FIG. 8 is a sectional view of a modification of the turbine rotor of the present invention shown in FIG. 6.

FIG. 8 is a sectional view showing a modification of the spacer 133 and the spacer plates 131, 132 in the embodiment shown in FIG. 6.

Figure 9:
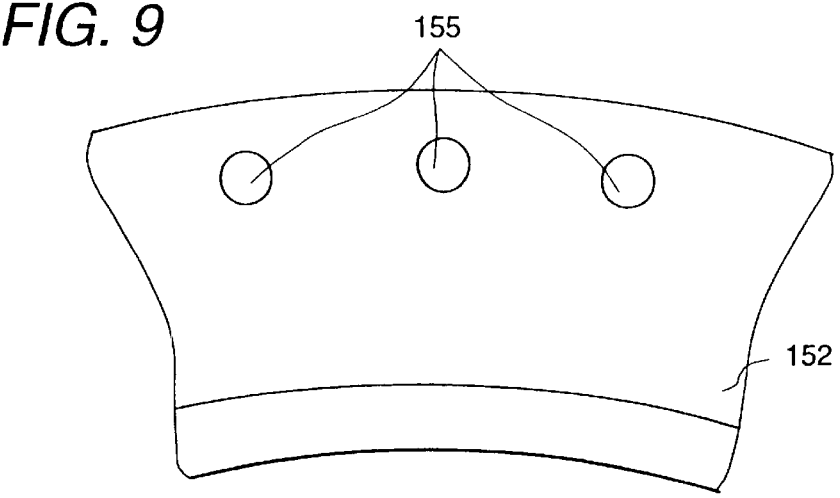
FIG. 9 is a front view of the spacer in part shown in FIG. 8, viewed from an axial direction.

151 denotes a first stage spacer adjacent to the first stage wheel 101, 152 denotes a spacer plate arranged so as to be sandwiched between the first stage wheel 101 and the first stage spacer 151, and 153 denotes a coolant recovery path. In the same manner as in the embodiment in FIG. 6, the spacer plate 152 is fitted in the spacer at a position 154 by shrinkage fit. The coolant having cooled the first stage turbine blades 7 bend in a L-shape toward the first stage spacer inside the first stage wheel 101 under the blades, flows in the coolant recovery path inside the spacer and then is led to the recovery cavity 144. FIG. 9 is a view of a part of the spacer plate 152, viewed in the axial direction. The spacer plate 152 has coolant recovery passages 155 for recovering the coolant. In the embodiment, in portions 157, 158 in the vicinity of the coolant recovery passages, the spacer plate 152 is sandwiched between the wheel and the spacer, so that the portions are heat-insulated. Therefore, even if a temperature difference is generated between the portions 157 and 158 in the vicinity of the coolant recovery passages, occurrence of large stress in the vicinity of the coolant recovery passages by this temperature difference is suppressed.

Figure 10:
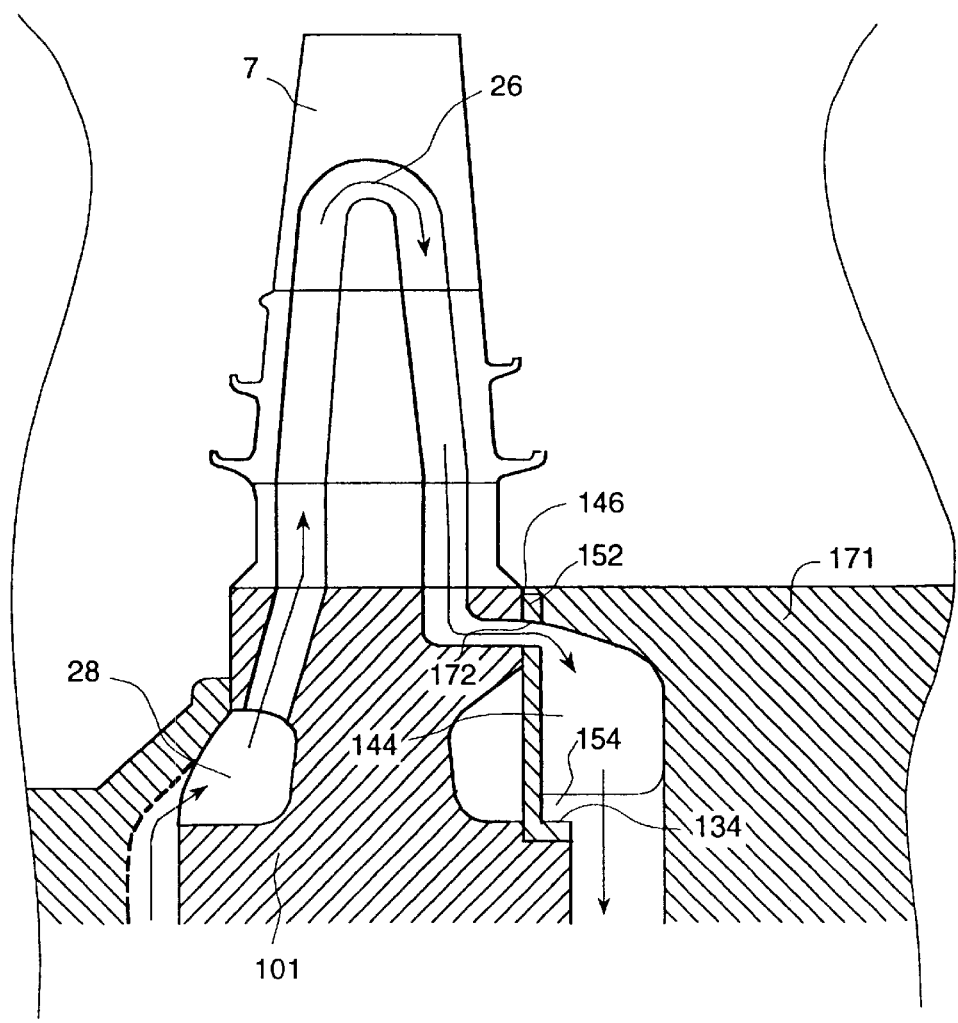
FIG. 10 is a sectional view of a modification of the turbine rotor of the present invention shown in FIG. 8.

Further, FIG. 10 is a sectional view of a modification of the spacer 151 in the embodiment shown in FIG. 8.

171 denotes a spacer and 172 denotes a coolant recovery path. The coolant having cooled the first stage turbine blades 7 bend in a L-shape toward the first stage spacer 171 inside the first stage wheel 101 under the blades, flows in the coolant recovery path inside the spacer and then is led to the recovery cavity 144. The spacer does not have threrein any coolant recovery passage for recovering the coolant. Therefore, the stress concentration due to the coolant recovery passage is not generated in the spacer, so that occurrence of stress in the spacer is reduced and the reliability of the spacer is improved.

Figure 11:
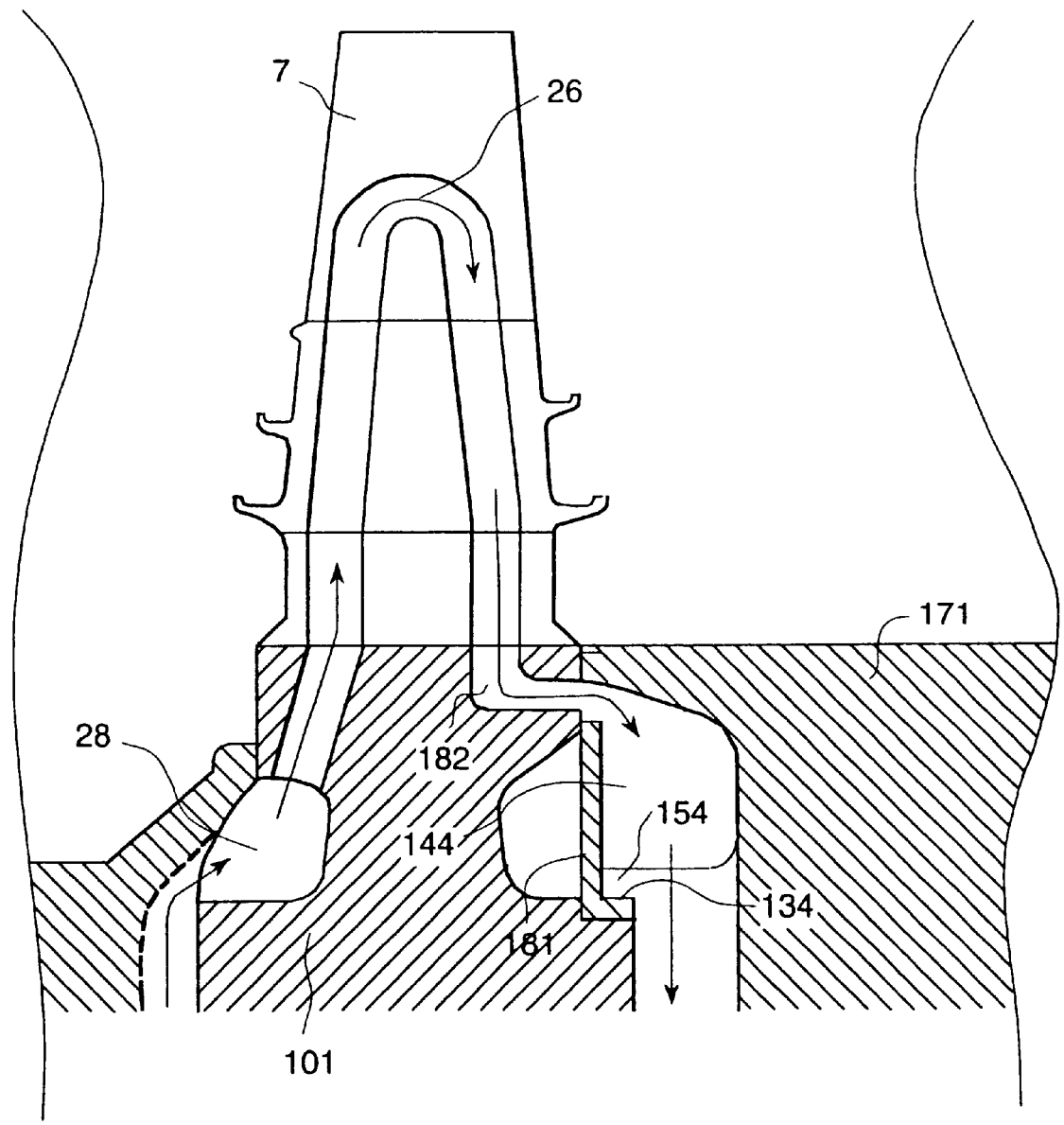
FIG. 11 is a sectional view of a modification of the turbine rotor of the present invention shown in FIG. 10.

Further, FIG. 11 is a sectional view of a modification of the spacer 152 in the embodiment shown in FIG. 10.

181 denotes a spacer plate and 182 denotes a coolant recovery path. The coolant having cooled the first stage turbine blades 7 bend in a L-shape toward the first stage spacer 171 inside the first stage wheel 101 under the blades, flows in the coolant recovery path inside the spacer and then is led to the recovery cavity 144. In the embodiment, since the spacer plate 181 does not have therein any coolant recovery passage, either, the stress concentration due to the coolant recovery passage is not generated in the spacer, so that occurrence of stress inside the spacer plate 181 is reduced and the reliability of the spacer plate is improved.

Figure 12:
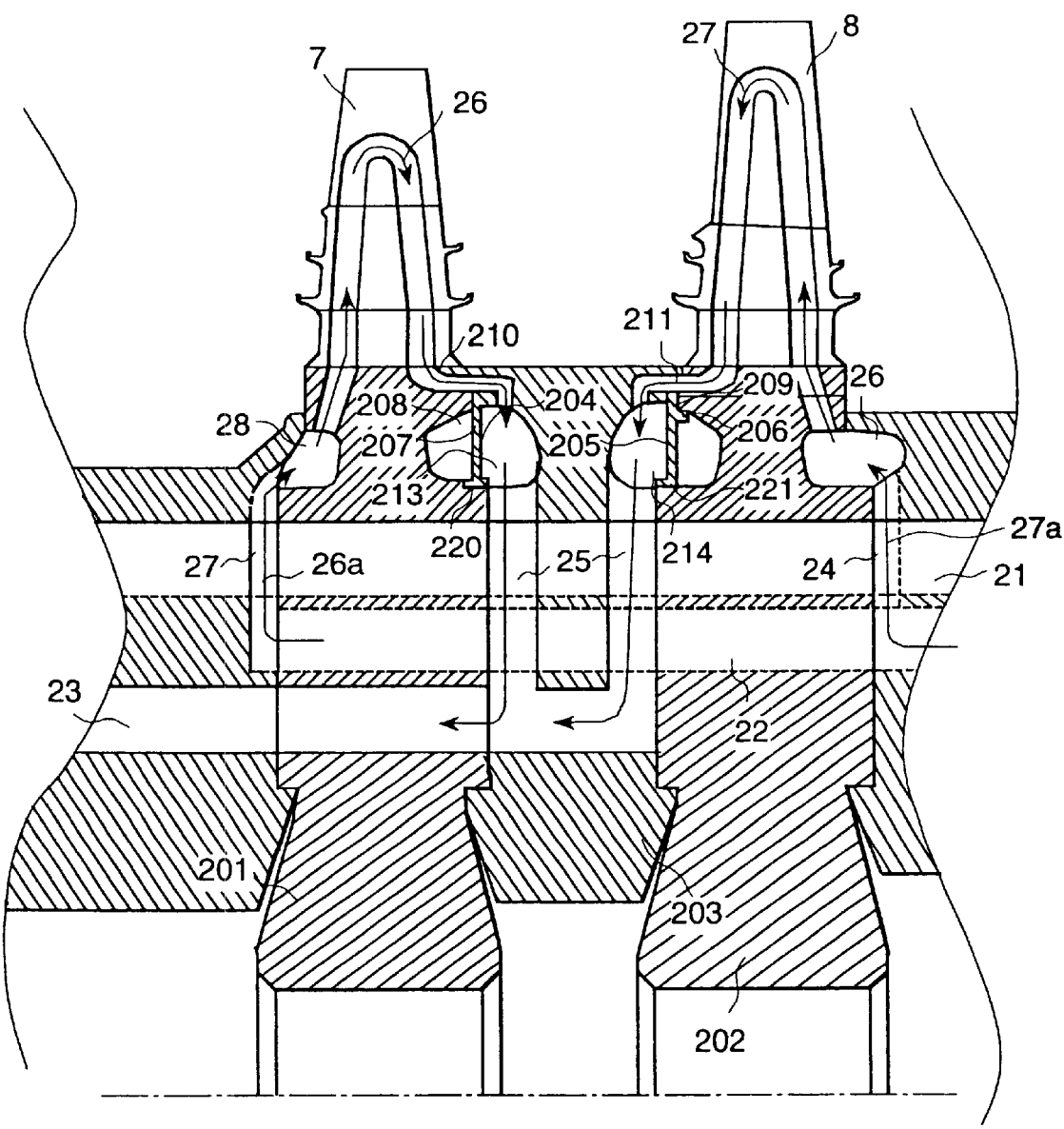
FIG. 12 is a sectional view of a turbine rotor of another embodiment of the present invention.

FIG. 12 is a sectional view of a turbine rotor of another embodiment of the invention.

Figure 13:
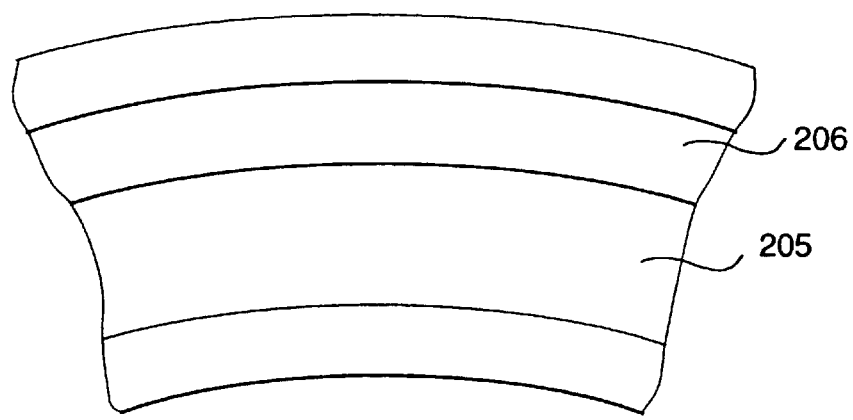
FIG. 13 is a front view of the spacer in part shown in FIG. 12, viewed from an axial direction.

201 denotes a first stage wheel, 202 denotes a second stage wheel, and 203 notes a first stage spacer. 204 and 205 each denote a spacer plate arranged so as to be sandwiched between the wheel and the spacer and having a projecting portion 206, 207 contacted with an inner peripheral side of a wheel projecting portion 208, 209. In the present embodiment, a lower portion of the turbine blade is elongated toward a radially inner side, and a coolant recovery path 210 in which the coolant having cooled the first stage turbine blades 7 flows bends in a L-shape toward the first stage spacer 203 inside the turbine blade. The recovery coolant from the turbine blade flows in the coolant recovery path inside the spacer and then is led to a recovery cavity 213. Further, a coolant recovery path 211 in which the coolant having cooled the second stage turbine blades 8 flows also bends in a L-shape toward the first stage spacer 203 inside the blade. The recovery coolant from the turbine blades flows in the coolant recovery path inside the spacer and then is led to a recovery cavity 214. By forming such a construction, it is possible to keep the high temperature recovery coolant not to contact with the wheel until the high temperature recovery coolant reaches to the recovery cavity. FIG. 13 is a view of a part of the spacer plate 204, 205, viewed in an axial direction. The spacer plate 204, 205 does not have any coolant recovery passage for recovering the coolant having cooled the turbine blades. Therefore, there is no stress concentration on the spacer plate, which may be caused if the spacer plate has a hole such as a coolant recovery path, so that the stress generated on the spacer plate is reduced and the reliability of the spacer plate is improved.

As a method of mounting the spacer plates 204, 205 so that the projecting portions 206, 207 of the spacer plates 204, 205 are in contact with the inner peripheral sides of the wheel projecting portions 208, 209, shrinkage fit is used.

Further, 21 denotes holes fir bolts 334 fixing the wheels and the spacer, 22 denotes a supply hole for supplying coolant, and 23 denotes a recovery hole for recovering the coolant. 213 denotes a recovery cavity formed by the first stage spacer 203 and the spacer plate 204 for collecting the coolant which has been high in temperature by cooling the first stage turbine blades 7, and 214 denotes a recovery cavity formed by the first stage spacer 203 and the spacer plate 205 for collecting the coolant which has been high in temperature by cooling the second stage turbine blades 8. It will be understood that the recovery cavities 213, 214 are formed so that high temperature recovery coolant inside the cavities is not contacted with the first stage wheel 201 or the second stage wheel 202. Therefore, since the first and second stage wheels 201, 202 do not directly contact with the high temperature recovery coolant, temperature distribution is hard to occur in the first and second stage wheel 201, 202, and occurrence of thermal stress and thermal deformation due to the temperature distribution are reduced.

Further, 24 and 27 denote supply mother pipes for leading the coolant from the supply hole 22 to the supply cavities 26, 28, respectively, and 25 denotes recovery mother pipes for leading the coolant from the recovery cavities 213, 214 to the recovery hole 23, respectively. 26a denotes a flow direction of coolant for cooling the first stage turbine blades 7, and 27a denotes a flow direction of coolant for coaling the second stage turbine blades 8. Here, the recovery coolant recovered after cooling the turbine blades is high in temperature.

In the present embodiment, since the spacer plates 204, 205 are fitted in and fixed to the wheel 201, 202 by shrinkage fit, the first stage wheel 201 and the spacer plate 204 forming the recovery cavity 214 are interlocked and move together, and the second wheel 202 and the spacer plate 205 forming the recovery cavity 214 also move interlocking with each other. Therefore, gaps 220, 221 are always small and it is easy to seal the gaps 220, 221 so as not to leak, and a quantity of coolant leakage from the recovery cavities 213, 214 can be reduced and the efficiency can be reduced to be lowered. Further, centrifugal force of the spacer plate 204, 205 acts on the inner peripheral sides of the wheel projecting portions 208, 209. Therefore, the centrifugal forces of the spacer plates 204, 205 do not act on the spacer, so that stress generated in the spacer can be suppressed. When the weight of the blade is small and an effect generated in the wheel is low and stress generated in the spacer is higher, the reliability of the spacer can be improved by applying the centrifugal forces due to the spacer plates to the wheels in this manner. Further, the stacking surface is not increased irrespective of provision of the spacer plates 204, 205, so that bending primary critical speed can be suppressed to be lowered.

Figure 30:
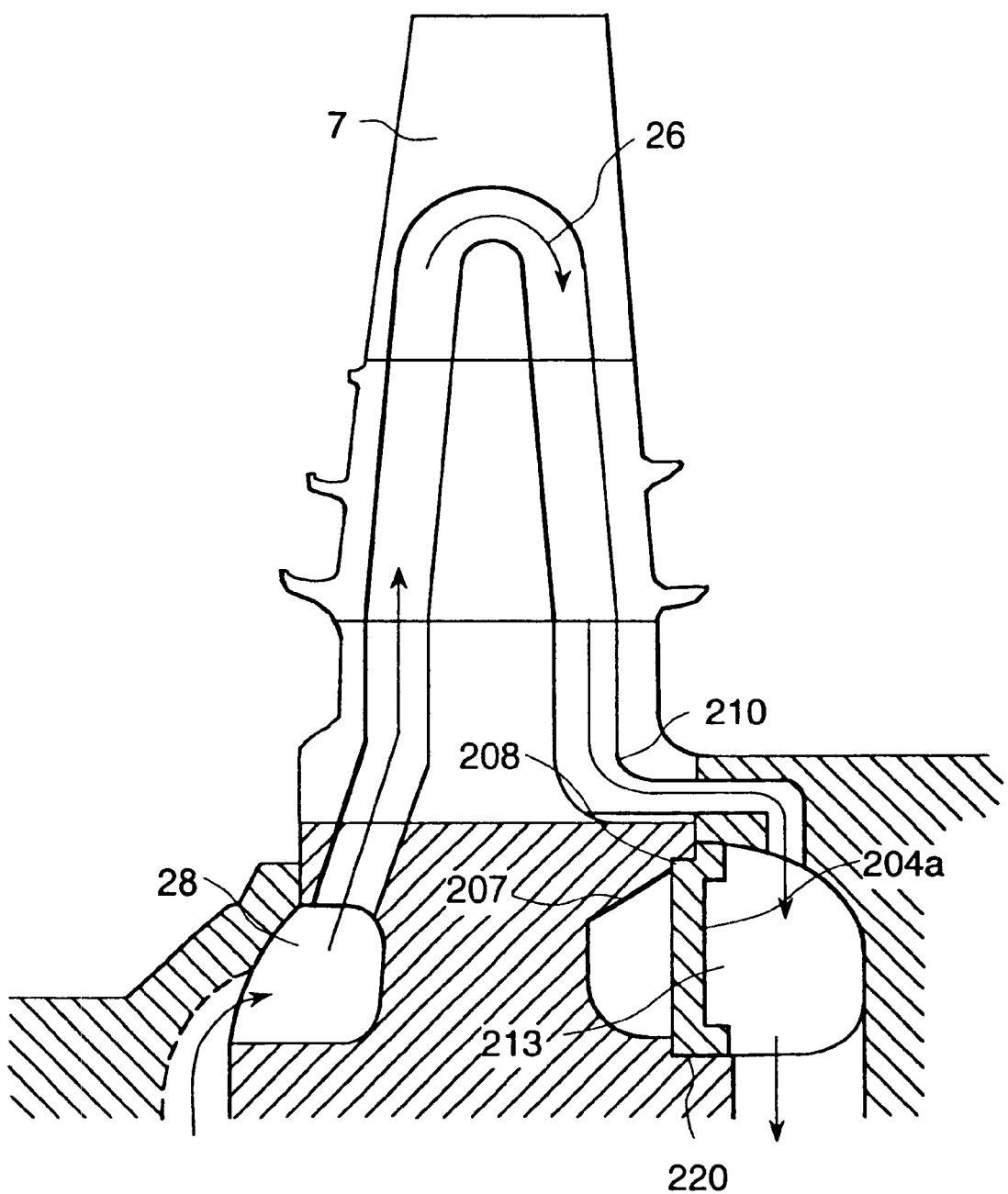
FIG. 30 is a sectional view of a turbine rotor of another embodiment of the present invention.

FIG. 30 is a sectional view of a modification of the spacer 204 in the embodiment shown in FIG. 12. 204a denotes a spacer plate. In the modification shown in FIG. 12, the center of gravity of the spacer 204A is deviated to the second stage turbine blade side from a fixing surface 208 of the spacer plate. Therefore, bending force is applied on the fixing surface by the centrifugal force during operation, whereby there is the possibility that the spacer plate 204 is dismounted from the wheel 201. In the embodiment shown in FIG. 30, the position of the center of gravity of the spacer plate 204a in the axial direction is close to a fixing position of the spacer plate 204a, so that bending force due to the centrifugal force is not applied to the fixing surface so much even during operation. Therefore, the possibility that the spacer plate 204 is dismounted from the wheel 201 is small, and the reliability of the rotor rises.

Figure 14:
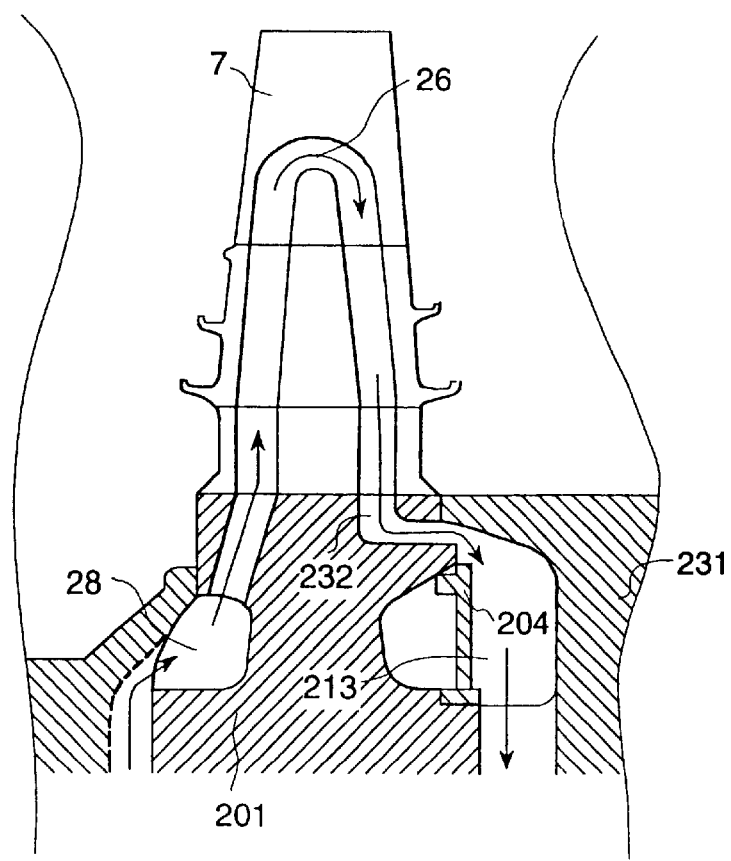
FIG. 14 is a sectional view of a modification of the turbine rotor of the present invention shown in FIG. 12.

FIG. 14 is a sectional view of a modification of the spacer 203 in the embodiment shown in FIG. 12. 231 denotes a spacer and 232 denotes a coolant recovery path. The coolant having cooled the first stage turbine blades 7 bend in a L-shape toward the spacer 231 inside the first stage wheel 201 under the blades and is led to the recovery cavity 213. In the present embodiment, the spacer 231 does not have a coolant recovery passage, either, so that the stress concentration due to the coolant recovery passage is not generated in the spacer, stress generated in the spacer 231 is reduced and the reliability of the spacer is improved.

Figure 15:
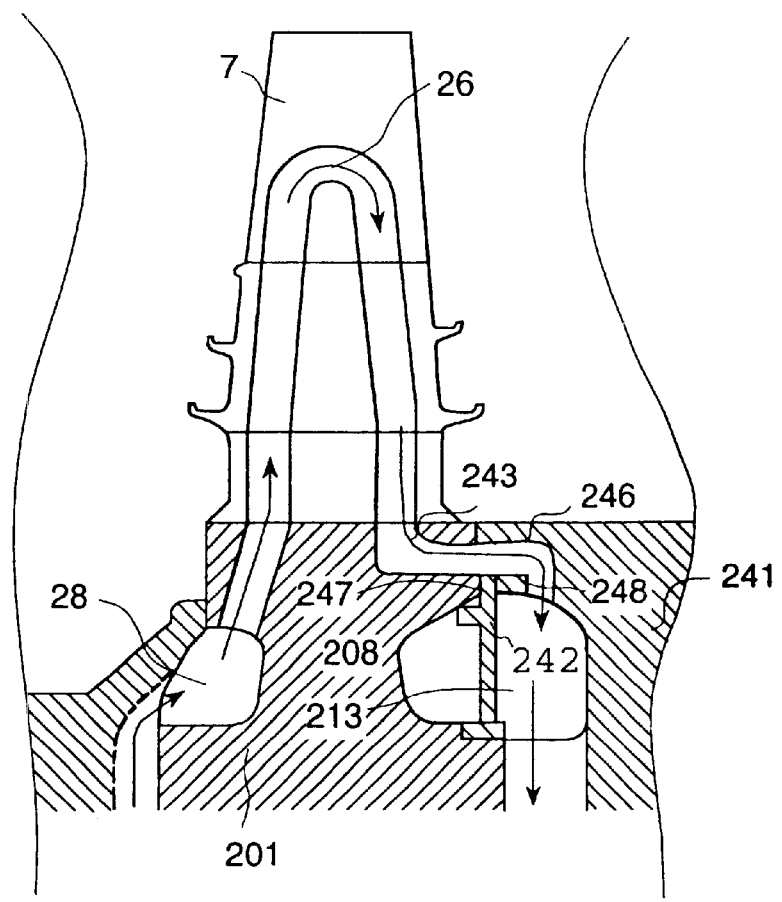
FIG. 15 is a sectional view of a modification of the turbine rotor of the present invention shown in FIG. 12.

FIG. 15 is a sectional view showing a modification of the spacer 203 and the spacer plates 204, 205 in the embedment shown in FIG. 12.

Figure 16:
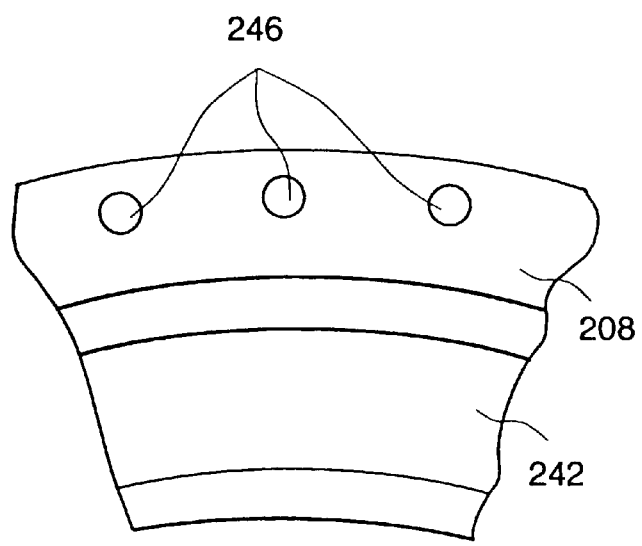
FIG. 16 is a front view of the spacer in part shown in FIG. 15, viewed from an axial direction.

241 denotes a spacer adjacent to the first stage wheel 201, 242 denotes a spacer plate arranged so as to be sandwiched between the wheel 201 and the spacer 241, and 243 denotes a coolant recovery path. In the same manner as in the embodiment in FIG. 12, the spacer plate 242 is fitted in the spacer at a position 208 by shrinkage fit. The coolant having cooled the first stage turbine blades 7 bend in a L-shape toward the first stage spacer 241 inside the first stage wheel 201 under the blades, flows in the coolant recovery path inside the spacer plate, flows in the coolant recovery path inside the spacer and then is led to the recovery cavity 213. FIG. 16 is a view of a part of the spacer plate 242, viewed in the axial direction. The spacer plate 242 has coolant recovery passages 246 for recovering the coolant. In the embodiment, in portions 247, 248 in the vicinity of the coolant recovery passages, the spacer plate 242 is sandwiched between the wheel and the spacer, so that the portions are heat-insulated. Therefore, even if a temperature difference is generated between the portions 247 and 248 in the vicinity of the coolant recovery passages, occurrence of large stress in the vicinity of the coolant recovery passages by this temperature difference is suppressed.

Figure 17:
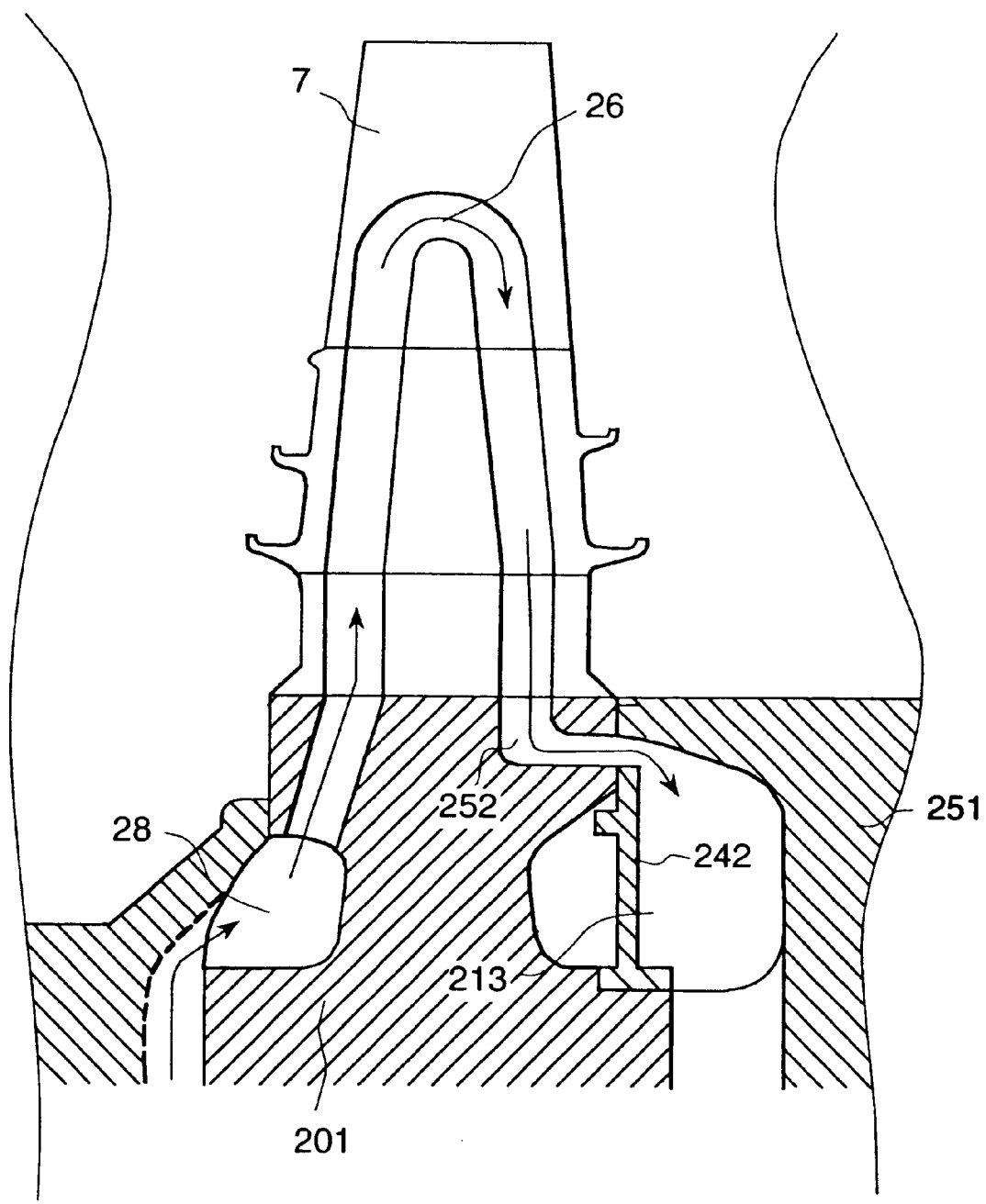
FIG. 17 is a sectional view of a modification of the turbine rotor of the present invention shown in FIG. 15.

Further, FIG. 17 is a sectional view of a modification of the spacer 241 in the embodiment shown in FIG. 15.

251 denotes a spacer and 252 denotes a coolant recovery path. The coolant having cooled the first stage turbine blades 7 bend in a L-shape toward the spacer 251 inside the first stage wheel 201 under the blades, flows in the coolant recovery path inside the spacer plate and then is led to the recovery cavity 213. In the present embodiment, the spacer does not have therein any coolant recovery passage for recovering the coolant. Therefore, the stress concentration due to the coolant recovery passage is not generated in the spacer, so that occurrence of stress in the spacer is reduced and the reliability of the spacer is improved.

Figure 18:
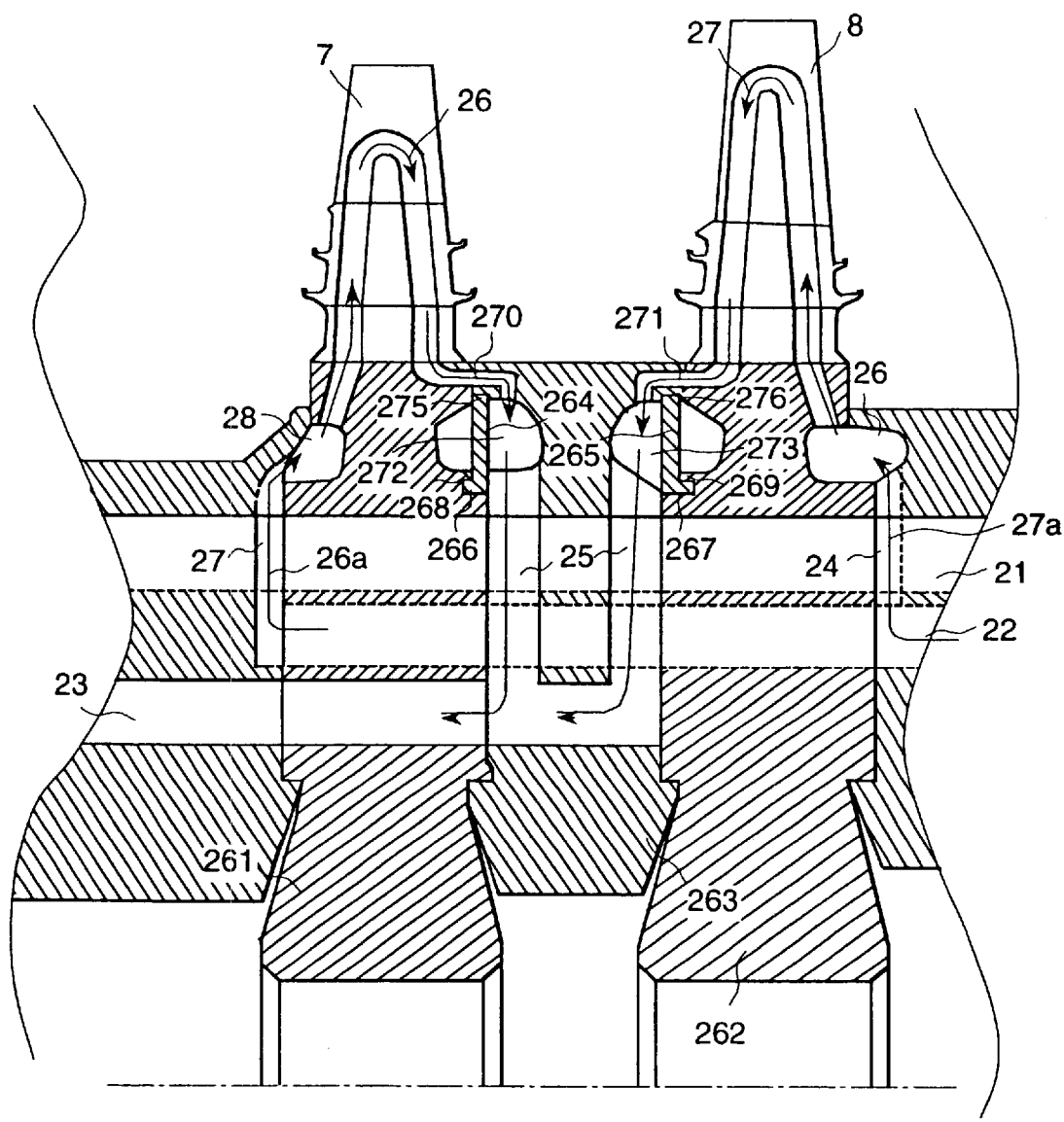
FIG. 18 is a sectional view of a turbine rotor of another embodiment of the present invention.

FIG. 18 is a sectional view of a turbine rotor of another embodiment of the invention.

Figure 19:
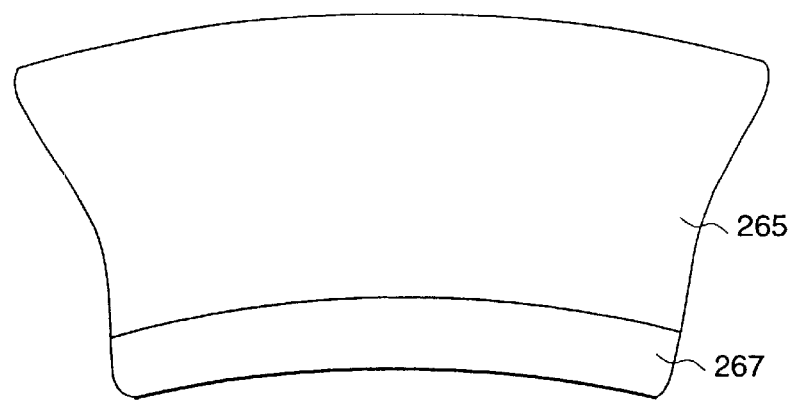
FIG. 19 is a front view of the spacer in part shown in FIG. 18, viewed from an axial direction.
Figure 20:
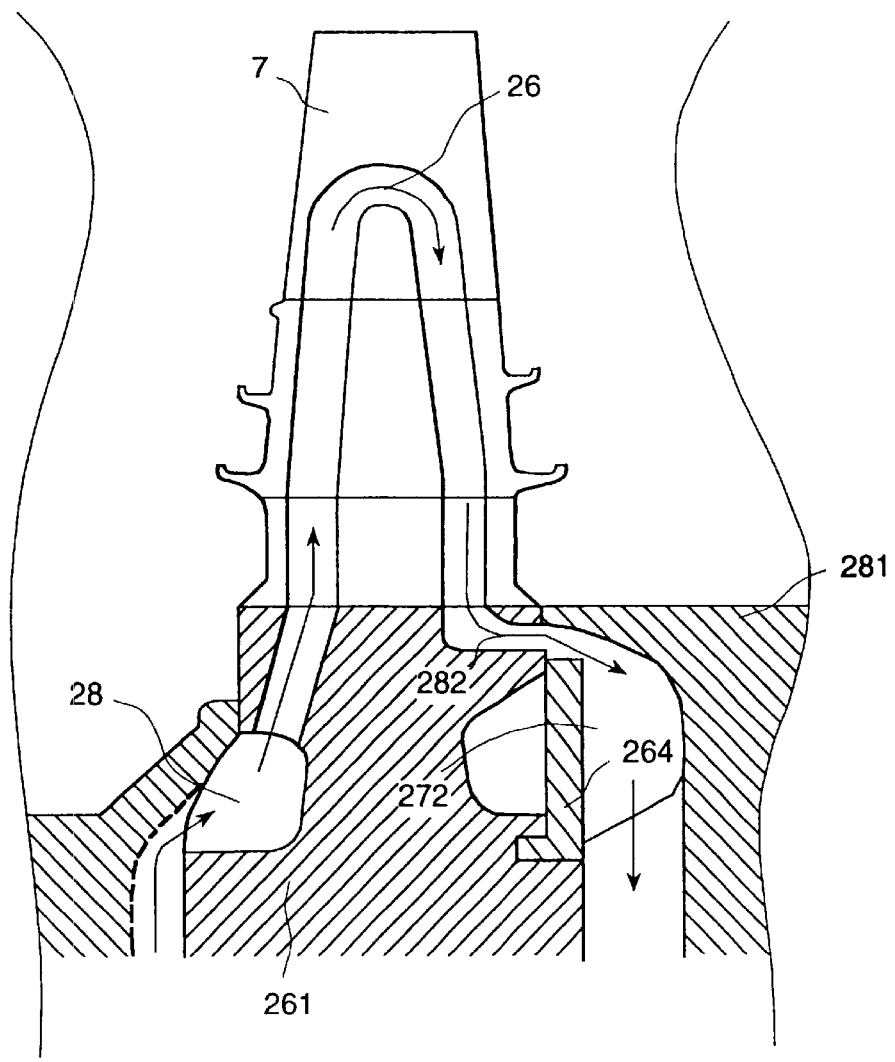
FIG. 20 is a sectional view of a modification of the turbine rotor of the present invention shown in FIG. 18.

261 denotes a first stage wheel, 262 denotes a second stage wheel, and 263 denotes a first stage spacer. 264 and 265 each denote a spacer plate, the outer peripheral portion 266, 267 of projecting portion of the lower end of which is contacted with an inner peripheral side of a projecting portion 268, 269 of a wheel shoulder portion. The coolant having cooled the first stage turbine blades 7 bends in a L-shape toward the first stage spacer 263 inside the first stage wheel under the turbine blade, flows in a coolant recovery path 270 and then is led to a recovery cavity 272. Further, the coolant having cooled the second stage turbine blades 8 bends in a L-shape toward the first stage spacer 263 inside the second stage wheel 262 under the blade, flows in a coolant recovery path 271 and then is led to a recovery cavity 273. FIG. 19 is a view of a part of the spacer plate 264, 265, viewed in an axial direction. The spacer plate 264, 265 does not have therein any coolant recovery passage for recovering the coolant having cooled the turbine blades. Therefore, there is no stress concentration on the spacer plate, which may be caused if the spacer plate has a hole such as a coolant recovery path, so that the stress generated on the spacer plate is reduced and the reliability of the spacer plate is improved.

As a method of mounting the spacer plates 264, 265 so that the projecting portions of the spacer plates 264, 265 are in contact with the inner peripheral sides of the projecting portions 268, 269 of the wheel shoulder portions, a shrinkage fit is used.

Further, 21 denotes holes for bolts 334 fixing the wheels and the spacer, 22 denotes a supply hole for supplying coolant, and 23 denotes a recovery hole for recovering the coolant. 272 denotes a recovery cavity formed by the first stage spacer 263 and the spacer plate 264 for collecting the coolant which has been high in temperature by cooling the first stage turbine blades 7, and 273 denotes a recovery cavity formed by the first stage spacer 263 and the spacer plate 265 for collecting the coolant which has been high in temperature by cooling the second stage turbine blades 8. It will be understood that the recovery cavities 272, 273 are formed so that high temperature recovery coolant inside the cavities is not contacted with the first stage wheel 261 or the second stage wheel 262. Therefore, since the first and second stage wheels 261, 262 do not directly contact with the high temperature recovery coolant, temperature distribution is hard to occur in the first and second stage wheel 261, 262, and occurrence of thermal stress and thermal deformation due to the temperature distribution are reduced.

Further, 24 and 27 denote supply mother pipes for leading the coolant from the supply hole 22 to the supply cavities 26, 28, respectively, and 25 denotes recovery mother pipes for leading the coolant from the recovery cavities 272, 273 to the recovery hole 23, respectively. 26a denotes a flow direction of coolant for cooling the first stage turbine blades 7, and 27a denotes a flow direction of coolant for cooling the second stage turbine blades 8. Here, the recovery coolant recovered after cooling the turbine blades is high in temperature. Further, the spacer plates 264, 265 are fitted in the wheels 261, 262 by shrinkage fit, and fixed to the wheels 261, 262. Therefore, the first stage wheel 261 and the spacer plate 264 forming the recovery cavity 272 in the present embodiment are interlocked and move together, and the second wheel 262 and the spacer plate 265 forming the recovery cavity 273 also move interlocking with each other. Therefore, gaps 275, 276 are always small and it is easy to seal the gaps 275, 276 so as not to leak, and a quantity of coolant leakage from the recovery cavities 272, 273 can be reduced and the efficiency can be reduced to be lowered. Further, centrifugal forces of the spacer plates 264, 265 act on the inner peripheral side of the wheel projecting portions 268, 269. Therefore, the centrifugal forces of the spacer plates 264, 265 do not act on the spacer, so that stress generated in the spacer can be suppressed. Further, the stacking surface is not increased irrespective of provision of the spacer plates 264, 265, so that bending primary critical speed can be suppressed to be lowered.

281 denotes a spacer and 282 denotes a coolant recovery path. The coolant having cooled the first stage turbine blades 7 bends in a L-shape toward the spacer 281 inside the first stage wheel 261 under the blades and is led to the recovery cavity 272. In the present embodiment, the spacer 281 does not have therein a coolant recovery passage, so that the stress concentration due to the coolant recovery passage is not generated in the spacer, stress generated in the spacer 281 is reduced and the reliability of the spacer is improved.

Figure 21:
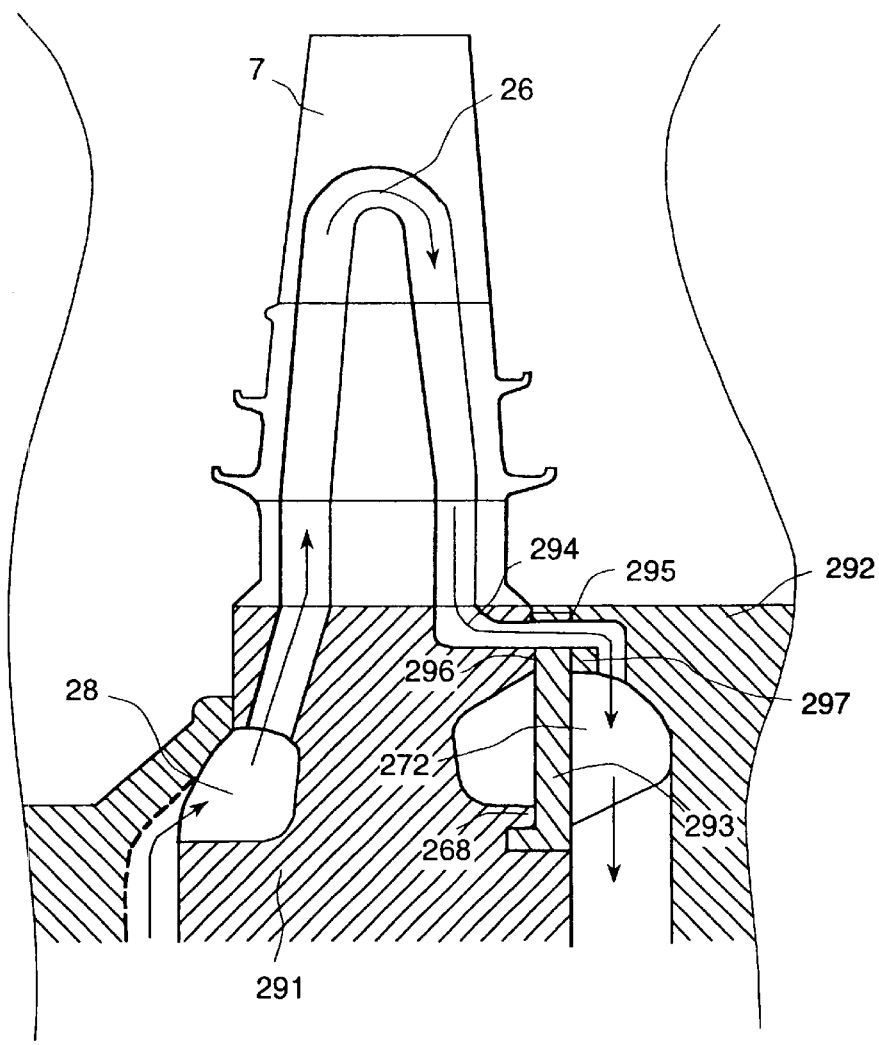
FIG. 21 is a sectional view of a modification of the turbine rotor of the present invention shown in FIG. 18.

FIG. 21 is a sectional view showing a modification of the wheel 261, the spacer 263 and the spacer plates 264, 265 in the embodiment shown in FIG. 18.

Figure 22:
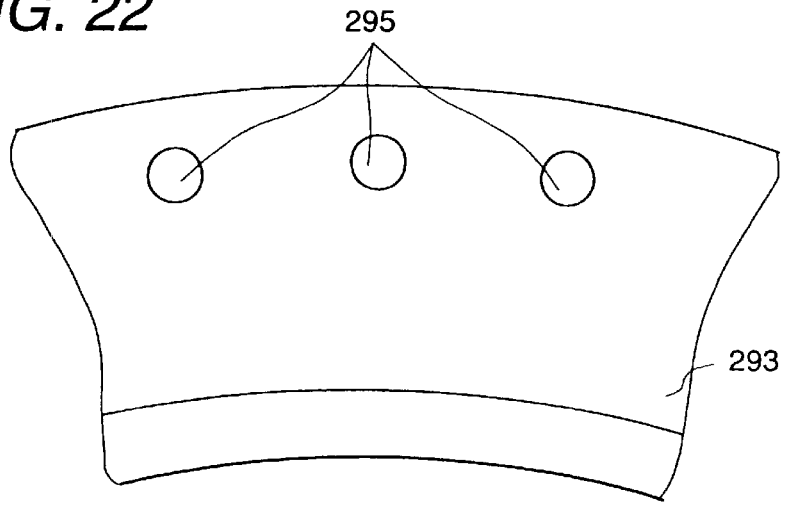
FIG. 22 is a front view of the spacer in part shown in FIG. 21, viewed from an axial direction.

291 denotes a wheel adjacent to a spacer 292, 293 denotes a spacer plate arranged so as to be sandwiched between the wheel 291 and the spacer 292, and 294 denotes a coolant recovery path. In the same manner as in the embodiment in FIG. 18, the spacer plate 293 is fitted in the spacer at a position 268 by shrinkage fit. The coolant having cooled the first stage turbine blades 7 bend in a L-shape toward the first stage spacer 292 inside the first stage wheel 291 under the blades, flows in the coolant recovery path inside the spacer plate, flows in the coolant recovery path inside the spacer and then is led to the coolant recovery cavity 272. FIG. 22 is a view of a part of the spacer plate 293, viewed in the axial direction. The spacer plate 293 has coolant recovery passages 295 for recovering the coolant. In the embodiment, in portions 296, 297 in the vicinity of the coolant recovery passages, the spacer plate is sandwiched between the wheel and the spacer, so that the portions are heat-insulated. Therefore, even if a temperature difference is generated between the portions 296 and 297 in the vicinity of the coolant recovery passages, occurrence of large stress in the vicinity of the coolant recovery passages by this temperature difference is suppressed.

Figure 23:
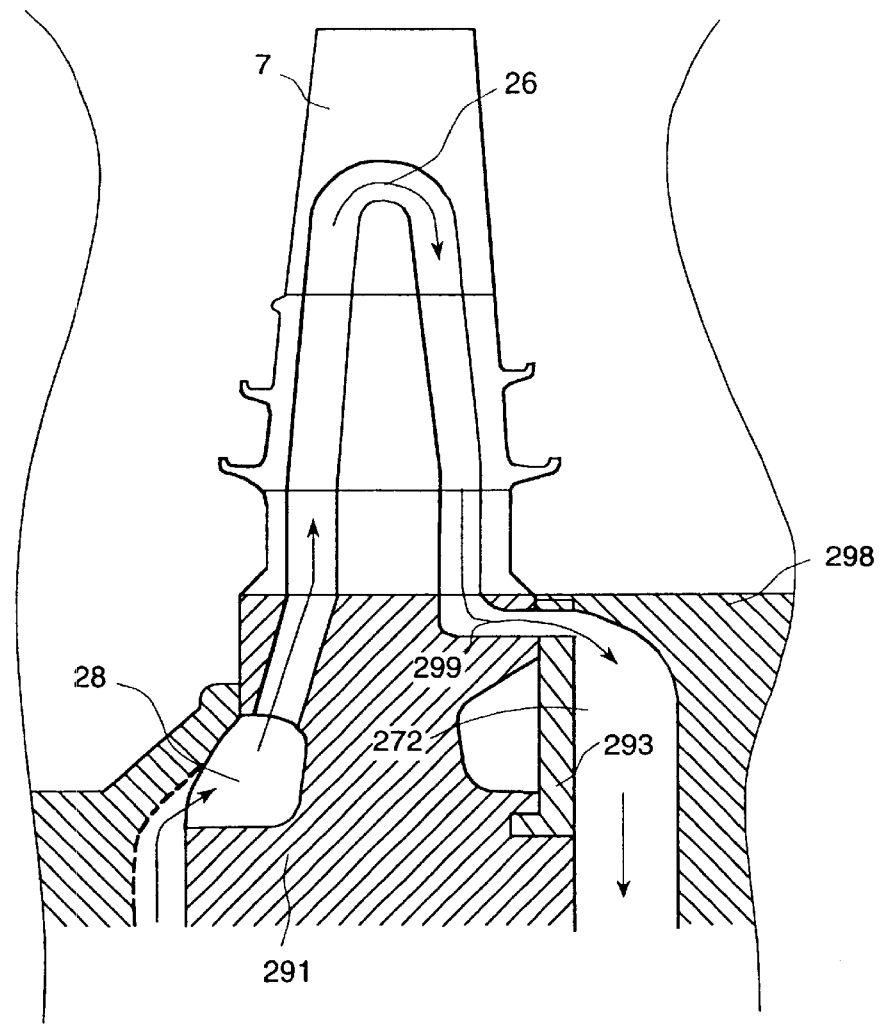
FIG. 23 is a sectional view of a modification of the turbine rotor of the present invention shown in FIG. 21.

FIG. 23 is a sectional view of a modification of the spacer 292 in the embodiment shown in FIG. 21.

298 denotes a spacer and 299 denotes a coolant recovery path. The coolant having cooled the first stage turbine blades 7 bends in a L-shape toward the spacer 293 inside the first stage wheel 291 under the blades, flows in the coolant recovery path inside the spacer plate and is led to the recovery cavity 272. In the present embodiment, the spacer does not have therein any coolant recovery passage, so that the stress concentration due to the coolant recovery passage is not generated in the spacer, the stress generated in the spacer is reduced and the reliability of the spacer is improved.

According to the present embodiment, since the recovery cavity for collecting the coolant which has been high in temperature by cooling the turbine blades is formed so as not to contact with the wheel, elevation of metal temperature of the wheel can be suppressed, whereby decrease in strength of the wheel can be suppressed. Further, since the high temperature recovery coolant does not directly contact with the wheel, temperature distribution is hard to occur and occurrence of thermal stress and thermal deformation by the temperature distribution can be reduced. Further, since the spacer and spacer plates forming the recovery cavity move interlocking with each other, leakage of recovery coolant from the recovery cavity is suppressed and the efficiency of the gas turbine can be suppressed to decrease.

Further, such a structure that the stacking surface does not increases irrespective of arrangement of the spacer plate between the wheel and the spacer is taken, the bending primary critical speed of the rotor can be suppressed to lower and it is possible to prevent the bending primary critical speed of the rotor from becoming lower than the rotation speed of the gas turbine during operation.

According to a further excellent embodiment, there is no hole perforated in the spacer plate which is a relatively small member between the wheel and the spacer, decrease in strength of the spacer plate can be prevented.

According to a still further excellent embodiment, since the spacer also has no hole perforated therein, it also is possible to prevent the strength of the spacer from being lowered.

According to the present invention, it is possible to reduce thermal stress induced in the wheel without increasing the stacking surface.

What is claimed is:

1. A turbine rotor comprising:
a plurality of turbine blades each having a coolant path formed inside and permitting coolant to flow therein;
a plurality of wheels having said plurality of turbine blades arranged annularly in peripheral portions thereof and forming said turbine rotor;
annular members each arranged between adjacent wheels of said plurality of wheels;
heat-resistant members provided on side surfaces of said wheels positioned at side surfaces of said annular members; and
wherein said coolant paths are formed so as to be positioned between said annular members and said heat resistant members and the coolant heated through heat-exchange with said turbine blades and flowing down through said coolant paths, faces said annular members.

2. A turbine rotor comprising:
a plurality of turbine blades each having a coolant path formed inside and permitting coolant to flow therein;
a plurality of wheels having said plurality of turbine blades arranged annularly in peripheral portions thereof and forming said turbine rotor;
annular members each arranged between adjacent wheels of said plurality of wheels;
heat-resistant members provided on side surfaces of said wheels positioned at side surfaces of said annular members; and
wherein said coolant paths are formed so as to be positioned between said annular members and said heat resistant members and said heat-resistant members are arranged so that the coolant heated through heat-exchange with said turbine blades and flowing down through said coolant paths, faces said annular members, and spaces are formed between said heat-resistant members and said annular members.

3. A turbine rotor comprising:
a plurality of turbine blades each having a coolant path formed inside and permitting coolant to flow therein;
a plurality of wheels having said plurality of turbine blades arranged annularly in peripheral portions thereof and forming said turbine rotor;
spacer members each arranged between adjacent wheels of said plurality of wheels;
partitioning members provided on side surfaces of said wheels facing side surfaces of said spacer members; and
wherein said coolant paths are formed so as to be positioned between said spacer members and said partitioning members and spaces are formed between said partitioning members and said spacer members by flow paths for the coolant passed through said coolant paths and flowing down from said turbine blades.

4. A turbine rotor comprising:
a plurality of turbine blades each having a coolant path formed inside and permitting coolant to flow therein;
a plurality of wheels having said plurality of turbine blades arranged annularly in peripheral portions thereof and forming said turbine rotor of a gas turbine;
spacer members each arranged between adjacent wheels of said plurality of wheels;
partitioning members provided on side surfaces of said wheels facing side surfaces of said spacer members; and
wherein said coolant paths are formed so as to be positioned between said spacer members and said partitioning members and spaces are formed between said partitioning members and said spacer members by flow paths for leading the coolant passed through said coolant paths and flowing down from said turbine blades, and spaces are formed between said wheel facing side surfaces of said spacer members and said partitioning members.

5. A turbine rotor comprising:
first and second wheels each having turbine blades fixed to a peripheral portion thereof; and
a spacer arranged so as to be sandwiched between said first and second wheels;
wherein a partitioning member is provided between said spacer and at least one of said first and second wheels,
coolant paths in which coolant for cooling said turbine blades flows, are provided inside said turbine blades, said coolant paths being formed so as to be positioned between said spacer and said partitioning member; and
a cavity formed by said partitioning member and said spacer is provided in a recovery course through which the coolant passed through said coolant paths is exhausted from said turbine blades.

6. A turbine rotor comprising:
first and second wheels each having turbine blades fixed to a peripheral portion thereof; and
a spacer arranged so as to be sandwiched between said first and second wheels;
wherein a partitioning member is provided between said spacer and at least one of said first and second wheels so that a stacking surface of one of said wheels and said spacer in contact with each other in a rotor axis direction does not increase,
coolant paths in which coolant for cooling said turbine blades flows, are provided inside said turbine blades, said coolant paths being formed so as to be positioned between said spacer and said partitioning member; and
a cavity formed by said partitioning member and said spacer is provided in a recovery course through which the coolant passed through said coolant paths is exhausted from said turbine blades.

7. A turbine rotor comprising:
a plurality of wheels each having turbine blades fixed to an outer peripheral portion thereof, and
a structure having stacking surfaces of said wheels and a spacer in contact in an axis direction of said wheels by arranging said wheels so that said spacer is sandwiched between said wheels, forming the rotor by passing bolts through said wheels and said spacer and fastening them, cooling said turbine blades with coolant, and recovering the coolant;
wherein spacer plates each having an inner diameter larger than an outer diameter of said stacking surface are arranged so as to be sandwiched between one of said wheels and said spacer, whereby recovery cavities for collecting the recovered coolant are formed by said spacer plates and said spacer.

8. A turbine rotor according to claim 7, wherein a cavity is formed between one of said spacer plates and at least one of said spacer and said wheel, adjacent to said spacer plate.

9. A turbine rotor according to claim 7, wherein a projecting portion in a rotor axis direction is provided on said spacer or one of said wheels, and said spacer plate is arranged so that an outer peripheral portion of said spacer plate contacts with an inner peripheral side portion of said projecting portion.

10. A turbine rotor according to claim 7, wherein said spacer plate is mounted on said spacer or one of said wheels by a shrinkage fit.

11. A turbine rotor according to claim 7, wherein a projecting portion in a rotor axis direction is provided on said spacer or one of said wheels, and said spacer plate is arranged so that an outer peripheral portion of said spacer plate contacts with an inner peripheral side portion of said projecting portion, and wherein a sealing means for suppressing leakage of the recovered coolant is provided between an inner peripheral side of said spacer plate and said spacer or one of said wheels.

12. A turbine rotor according to claim 7, wherein a projecting portion is provided on said spacer plate on the spacer side in a rotor axis direction, a recess portion which is able to engage with said projecting portion is provided in said spacer or one of said wheels, and said spacer plate is arranged so that an outer peripheral side of said projecting portion of said spacer plate contacts with an inner peripheral side of said recess of said spacer or one of said wheels.

13. A turbine rotor according to claim 7, wherein a projecting portion is provided on said spacer plate on the spacer side in a rotor axis direction, a recess portion which is able to engage with said projecting portion is provided in said spacer or one of said wheels, and said spacer plate is arranged so that an outer peripheral side of said projecting portion of said spacer plate contacts with an inner peripheral side of said recess of said spacer or one of said wheels, and wherein a sealing means for suppressing leakage of the recovered coolant is provided between an outer peripheral side of said spacer plate and said spacer or one of said wheels.

14. A turbine rotor according to claim 7, wherein a hole is provided in said spacer plate along the rotor axis direction.

15. A turbine rotor according to claim 7, wherein said turbine rotor is a turbine rotor of a gas turbine.

16. A cooling method of turbine blades of a turbine rotor provided with a plurality of wheels having said turbine blades arranged annularly in peripheral portions thereof and forming said turbine rotor and annular members each arranged between adjacent wheels of said plurality of wheels, wherein
heat-resistant members are provided on side surfaces of said wheels positioned at side surfaces of said annular members, and
coolant is flowed in coolant paths formed in said turbine blades, said coolant paths being formed so as to be positioned between said annular members and said heat resistant members, and the coolant heated by heat-exchange with said turbine blades and flowing down through said coolant paths, faces said annular members.

17. A cooling method of turbine blades of a turbine rotor provided with first and second wheels, each having said turbine blades fixed to a peripheral portion and a spacer arranged so as to be sandwiched between said first and second wheels,
wherein a partitioning member is provided between said spacer and at least one of said first and second wheels,
coolant for cooling said turbine blades is flowed to pass through coolant paths formed inside said turbine blades and said coolant paths are formed so as to be positioned between said spacer and said partitioning member, and
the coolant flowed from said turbine blades is exhausted through a cavity formed by said partitioning member and said spacer.

18. A cooling method of turbine blades of a turbine rotor provided with first and second wheels, each having said turbine blades fixed to a peripheral portion thereof, and a spacer arranged so as to be sandwiched between said first and second wheels, wherein a partitioning member is provided between said spacer and at least one of said first and second wheels so that a stacking surface that said wheel and said spacer contact in the rotor axis direction does not increase, coolant for cooling said turbine blades is flowed to pass through coolant paths provided inside said turbine blades, said coolant paths being formed so as to be positioned between said spacer and said portioning member, and the coolant flowed from said turbine blades is exhausted through a cavity formed by said partitioning member and said spacer.

19. A gas turbine provided with a turbine rotor, said turbine rotor comprising:

a plurality of turbine blades each having a coolant path formed inside and permitting coolant to flow therein;

a plurality of wheels having said plurality of turbine blades arranged annularly in peripheral portions thereof and forming said turbine rotor;

annular members each arranged between adjacent wheels of said plurality of wheels;

heat-resistant members provided on side surfaces of said wheels positioned at side surfaces of said annular members; and wherein said coolant paths are formed so as to be positioned between said annular members and said heat resistant members and the coolant heated through heat-exchange with said turbine blades and flowing down through said coolant paths, faces said annular members.

20. A turbine rotor according to claim 1, wherein said annular members and said wheels are fixed by bolts passing through said annular members and said wheels in a rotor axis direction.

* * * * *